United States Patent
Dorrell

(10) Patent No.: US 6,714,202 B2
(45) Date of Patent: Mar. 30, 2004

(54) METHOD FOR ENCODING ANIMATION IN AN IMAGE FILE

(75) Inventor: Andrew James Dorrell, East Blaxland (AU)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 09/726,026

(22) Filed: Nov. 30, 2000

(65) Prior Publication Data

US 2001/0026277 A1 Oct. 4, 2001

(30) Foreign Application Priority Data

Dec. 2, 1999 (AU) .............................................. PQ4415
May 24, 2000 (AU) .............................................. PQ7724

(51) Int. Cl.[7] ............................................. G06T 15/00
(52) U.S. Cl. ...................................................... 345/474
(58) Field of Search ................................ 345/473, 474, 345/475; 707/501.1

(56) References Cited

U.S. PATENT DOCUMENTS 5,619,639 A * 4/1997 Mast ........................... 345/798
6,141,019 A * 10/2000 Roseborough et al. ...... 345/473
6,433,784 B1 * 8/2002 Merrick et al. ............. 345/473

OTHER PUBLICATIONS

MNG (Multi–Image Network Graphics) Format Version 0.96, (Randers–Pehrson, ed.) Jul. 19, 1999.

Graphics Interchange Format (sm), Version 89a, CompuServe Inc., Columbus, Ohio, Jul. 31, 1990.

"JPEG 2000—Lossless and Lossy Compression of Continuous–Tone And Bi–Level Still Images: Part II Value–Added Extensions," JPEG 2000 Pre–working Draft, Dec. 2, 1999, pp. 1–30.

* cited by examiner

Primary Examiner—Phu K. Nguyen
(74) Attorney, Agent, or Firm—Fitzpatrick, Cella, Harper & Scinto

(57) ABSTRACT

A method of processing a multi-layer image file (100) comprising a first plurality of image layers (106–108), and a second plurality of control blocks (120–122) is disclosed. The processing produces an animation sequence. The method comprises processing an image layer (eg 106) in accordance with a corresponding control block (eg 120), thereby providing an image for said animation sequence. The method further comprises tagging the image layer (106) for reprocessing, if the image layer (106) is to be used again in the image sequence, said tagging using a relative address referred to one of (i) an address of said corresponding control block (120) and (ii) an address of a control block corresponding to another image layer.

13 Claims, 19 Drawing Sheets

METHOD FOR ENCODING ANIMATION IN AN IMAGE FILE

TECHNICAL FIELD OF THE INVENTION

The current invention relates to multi-layered image file formats and in particular multi-layer image files which are intended to be displayed as an animation, or alternatively, in the context of a multi-layer composite image.

BACKGROUND ART

Multi-layer (or multi-page) images can be thought of as a set of images, all typically but not necessarily the same size, which are somehow combined for the purpose of displaying on an output display device 114. Thus multi-layer refers to multiple images in a single file. Each image in the file is referred to as a layer There are currently two significant applications areas for which multi-layer images are used and they include:

- image editing and graphic design; and
- animation, especially animation in web pages on the Internet.

In the area of image editing and graphic design, multi-layer images allow a composition of complex scenes as different images are layered over each other. In this case it is usual for each layer to have an opacity (or alpha) channel associated with it. To display the various layers (images) on a display device 114 a first layer (typically a background image) is rendered and subsequent layer is then composited upon the first layer, for example, according to the following equations.

$$Ac = 1 - (1-At)(1-Ab) \quad (1)$$

$$s = At/Ac \quad (2)$$

$$t = (1-At)Ab/Ac \quad (3)$$

$$Rc = sRt + tRb \quad (4)$$

$$Gc = sGt + tGb \quad (5)$$

$$Bc = sBt + tBb \quad (6)$$

In the above equations: the background image is specified in the RGBA (Red, Green, Blue and Alpha) colour space as (Rb, Gb, Bb Ab); a foreground (or top) image is specified in the RGBA colour space as (Rt, Gt, Bt, At); and the output or composite image is specified in the RGBA colour space as (Rc, Gc, Bc, Ac). Each subsequent (or new) layer is taken to be a foreground image until it is combined (composited) with a previous layer, wherein the combination is then taken to be a (new) background image. In this manner it is possible to combine a number of layers by sequential applications of equations (4–6) to each new layer in turn in order to form a final composite image. Other compositing operations are also possible however the one described herein-before with reference to equations (1) to (6) is the most commonly used.

The other noteworthy application of multi-layer images, noted above, is animation. For this purpose, currently, the most widely used file format is the Graphics Interchange Format (GIF). The GIF also contains layers (or multiple images) which are composited in sequence order. Each layer of a GIF file may be of different size and is positioned using offset coordinates in order to improve storage efficiency in cases where only small areas contain changes from one layer to the next. The GIF standard defines a virtual screen upon which each layer is composited. It uses a control block structure to indicate how the layers in the file are to be displayed. Each layer of the file format is preceded by a control block which contains: information about the location of the top left corner in the virtual screen, information on how long the layer should be displayed before proceeding to the next layer in the file; and whether the layer should be removed prior to display of a next layer in the file. This (control block based) structure allows for particularly simple software implementation of the decoder. In fact very little additional coding is required to implement a GIF decoder capable of correctly displaying multi-layer animated GIF images.

The animation scheme employed by GIF has been adopted widely in a very short space of time. The primary reason for this is the simple and restricted design. These features make it easy for a large number of independent developers to implement file viewers capable of handling GIF animations. However the simplicity of GIF comes at the price of efficiency in coding. For example, as each layer in an animated GE file corresponds to a single display frame, animation using sprites and overlays is not coded efficiently. This is because each frame must be present as a separate image layer. Images that are reused through the course of an animation must appear once in the file for each frame they appear in.

More recently, the Multiple Image Network Graphics (MNG) file format, which is still being developed, has attempted to address this problem. MNG defines an animation framework based on extensions to the Portable Network Graphics (PNG) file format. However, while MNG permits the reuse of layers, much of the simplicity that characterised the success of GIF is lost. In addition, the methods used by MNG to describe the animation do not lead naturally to an implementation model. This makes the development of viewers for MNG animations notably more difficult to implement. To help address this problem the creators of MNG have proposed low complexity and very low complexity subsets of the fill MNG standard. The problem with this however is that the low complexity subsets achieve little more functionality than GIF and have the same coding efficiency problems.

SUMMARY OF THE INVENTION

It is an object of the present invention to substantially overcome, or at least ameliorate, one or more disadvantages of existing arrangements.

According to a first aspect of the invention, there is provided a method of processing a multi-layer image file comprising (i) a first plurality of image layers, and (ii) a second plurality of control blocks, said processing producing an animation sequence, said method comprising steps of:

providing a plurality of control blocks in said image file, each control block being associated with at least one of said image layers, wherein each control block is characterised by an information control field indicating which one of said control blocks and associated image layers to loop back to; and sequentially executing each control block and looping back to a previous control block and associated layer in said execution sequence in accordance with the indication provided by said information control field.

According to a another aspect of the invention, there is provided a method of animating a sequence of images, wherein said images are contained in a single multi-layer file, the method comprising the steps of:

a) providing a plurality of control blocks in said image file, each control block being associated with at least one of said images, wherein each control block is characterized by an information control field indicating which one of said images is next in sequence, and at least one control block having an information control field indicating a previous image in the sequence;

b) reading a current information control field from a current control block;

c) displaying the image associated with the current control block;

d) if the current information control field indicates a loop-back to a previous image then taking the control block of the previous image as the current control block, otherwise taking the control block of a next image in the sequence as the current control block; and e) repeating steps b) through to e).

According to a another aspect of the invention, there is provided a method for providing an animation of one or more images of a plurality of images, said method comprising steps of:

storing said plurality of images in a first order;

determining a commencing image of said animation;

determining a commencing address for the commencing image;

establishing an animation order for said one or more images, said animation order commencing with said commencing image;

animating said one or more images dependent upon said animation order, using to relative addressing referred to said commencing address; and reusing at least one image of said one or more images, if said at least one image occurs more than once in the animation order.

According to a another aspect of the invention, there is provided a method of processing a multi-layer image file comprising (i) a first plurality of image layers, and (ii) a second plurality of control blocks, said processing producing an animation sequence, said method comprising steps of:

processing an image layer in accordance with a corresponding control block, thereby providing an image for said animation sequence;

tagging the image layer for reprocessing, if the image layer is to be used again in the image sequence, said tagging using a relative address referred to an address of said corresponding control block;

re-using said image layer in accordance with a next control block, thereby providing a next image for the animation sequence, if said relative address is a next address to the address of said corresponding control block; and using a next image layer in accordance with said next control block, thereby providing said next image for the animation sequence, if said relative address is a subsequent address to said next address.

According to a another aspect of the invention, there is provided a method of processing a multi-layer image file comprising (i) a first plurality of image layers, and (ii) a second plurality of control blocks, said processing producing an animation sequence, said method comprising steps of:

processing an image layer in accordance with a corresponding control block, thereby providing an image for said animation sequence;

tagging the image layer for reprocessing, if the image layer is to be used again in the image sequence, said tagging using a relative address referred to an address of said corresponding control block;

re-using said image layer in accordance with a later control block, thereby providing a later image for the animation sequence, if said relative address is a later address referred to the address of said corresponding control block; and using a next image layer in accordance with a next control block, thereby providing a next image for the animation sequence, if said relative address is a subsequent address to said next address.

According to a another aspect of the invention, there is provided an apparatus for processing a multi-layer image file comprising (i) a first plurality of image layers, and (ii) a second plurality of control blocks, said processing producing an animation sequence, said apparatus comprising:

processing means for processing an image layer in accordance with a corresponding control block, thereby providing an image for said animation sequence;

tagging means for tagging the image layer for reprocessing, if the image layer is to be used again in the image sequence, said tagging using a relative address referred to an address of said corresponding control block; and re-use means for re-using said image layer in accordance with a next control block, thereby providing a next image for the animation sequence, if said relative address is a next address to the address of said corresponding control block.

According to a another aspect of the invention, there is provided an apparatus adapted to animate one or more images of a plurality of images, said apparatus comprising:

a file structure means for storing said plurality of images in a first order;

an anchor address means for determining a commencing address of a commencing image of said one or more images;

an instruction set means for establishing an animation order for said one or more images using relative addressing referred to said commencing address;

an animation means for providing an animation of said one or more images in said animation order; and image re-use means for re-using at least one image of said one or more images if said at least one image occurs more than once in said animation order.

According to a another aspect of the invention, there is provided a multi-layer image file encoded for animation, said image file comprising:

a first plurality of image layers; and a second plurality of control blocks; wherein an image layer is processed in accordance with a corresponding control block, thereby providing an image for said animation sequence; and wherein the image layer is tagged for reprocessing, if the image layer is to be used again in the image sequence, said tagging using a relative address referred to an address of said corresponding control block.

According to a another aspect of the invention, there is provided a multi-layer image file comprising:

(a) a plurality of images stored in a first order;

(b) a first animation instruction for execution, said first animation instruction comprising:

(i) a commencing address of a commencing image of said plurality of images to be animated;

(ii) at least one animation attribute of said commencing image.

(c) at least one next animation instruction to be executed, said first animation instruction and said at least one next animation instruction being executed in a sequential order, each said at least one next animation instruction comprising:

(i) a relative address of a next image of said plurality of images to be animated, said relative address being referred to one of said commencing address and a preceding relative address;

(ii) at least one animation attribute of said next image.

According to a another aspect of the invention, there is provided a computer readable memory medium for storing a program for apparatus which processes a multi-layer image file comprising (i) a first plurality of image layers, and (ii) a second plurality of control blocks, said processing producing an animation sequence, said program comprising:

code for a processing step for processing an image layer in accordance with a corresponding control block, thereby providing an image for said animation sequence; and code for a tagging step for tagging the image layer for reprocessing, if the image layer is to be used again in the image sequence, said tagging using a relative address referred to an address of said corresponding control block.

BRIEF DESCRIPTION OF THE DRAWINGS

A number of embodiments of the present invention will now be described with reference to the drawings, in which.

DETAILED DESCRIPTION INCLUDING BEST MODE

Figure 1:
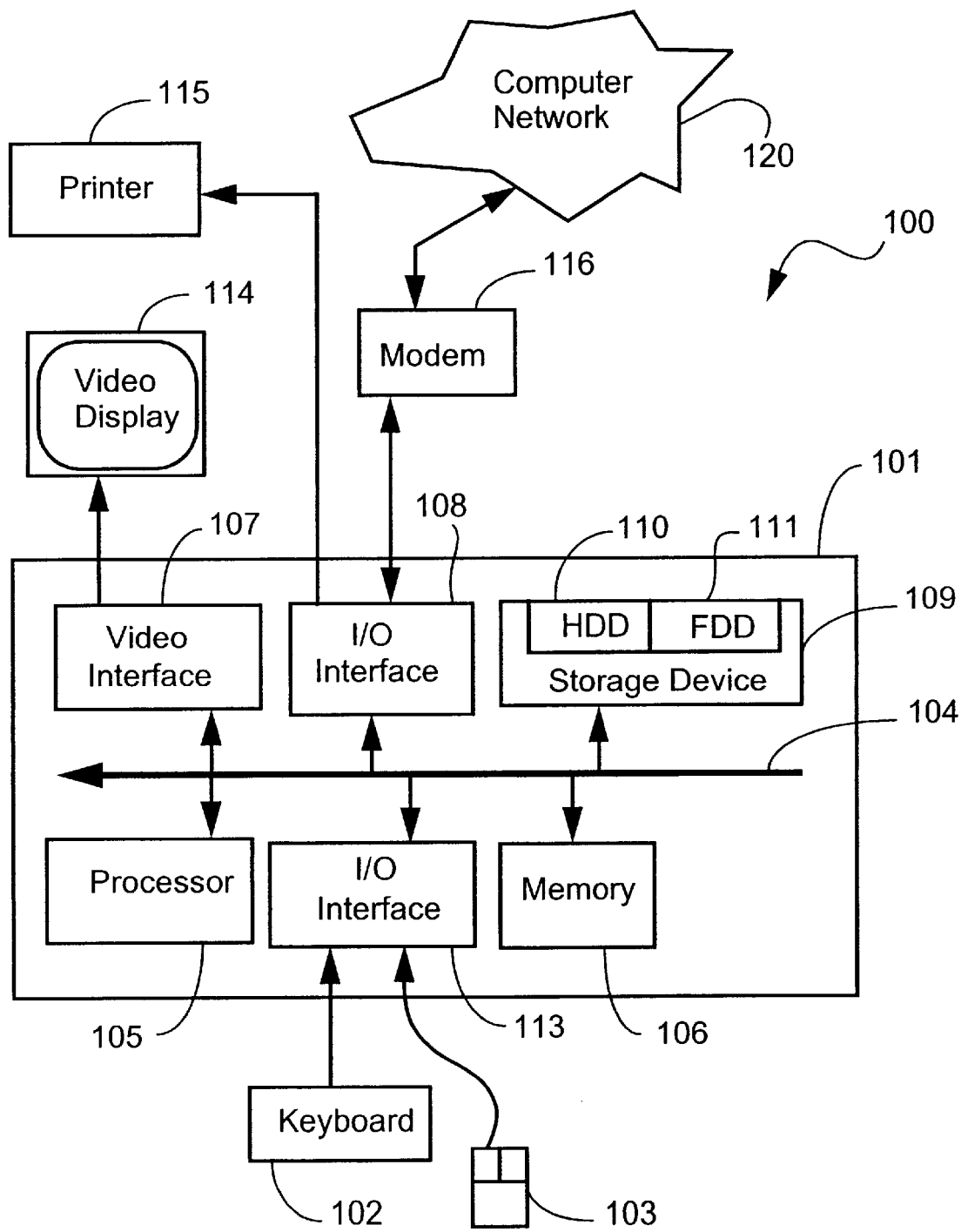
FIG. 1 is a schematic block diagram of a general-purpose computer with which embodiments of the present invention can be practiced.

Where reference is made in any one or more of the accompanying drawings to steps and/or features, which have the same reference numerals, those steps and/or features have for the purposes of this description the same function (s) or operation(s), unless the contrary intention appears.

One embodiment of the invention can preferably be practiced using a general-purpose computer, such as the one shown in FIG. 1, wherein the processes of FIGS. 2 to 8, and FIGS. 12–19 may be implemented as software executing on the computer. In particular, the steps of the encoding, decoding methods are effected by instructions in the software that are carried out by the computer. The coding algorithm for providing signalling to of the structure of a code stream representing a digital image may also be implemented by instructions in software carried out by the computer. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding digital images, decoding or signalling the structure coded representations of digital images in accordance with the embodiments of the invention.

The computer system 100 consists of the computer 101, a video display 114, and input devices 102, 103. In addition, the computer system 100 can have any of a number of other output devices 115 including line printers, laser printers, plotters, and other reproduction devices connected to the computer 101. The computer system 100 can be connected to one or more other computers using an appropriate communication channel via a modem 116, a computer network 120, or the like. The computer network may include a local area network (LAN), a wide area network (WAN), an Intranet, and/or the Internet.

The computer 101 itself consists of a central processing unit(s) (simply referred to as a processor hereinafter) 105, a memory 106 which may include random access memory (RAM) and read-only memory (ROM), an input/output (IO) interface 108, a video interface 107, and one or more storage devices generally represented by a block 109 in FIG. 1. The storage device(s) 109 can consist of one or more of the following: a floppy disc 111, a hard disc drive 110, a magneto-optical disc drive, CD-ROM, magnetic tape or any other of a number of non-volatile storage devices well known to those skilled in the art. Each of the components 105 to 113 is typically connected to one or more of the other devices via a bus 104 that in turn can consist of data, address, and control buses.

The video interface 107 is connected to the video display 114 and provides video signals from the computer 101 for display on the video display 114. User input to operate the computer 101 can be provided by one or more input devices. For example, an operator can use the keyboard 102 and/or a pointing device such as the mouse 103 to provide input to the computer 101.

The system 100 is simply provided for illustrative purposes and other configurations can be employed without departing from the scope and spirit of the invention. Exemplary computers on which embodiments can be practiced include IBM-PC/ATs or compatibles, one of the Macintosh (TM) family of PCs, Sun Sparcstation (TM), or the like. The foregoing are merely exemplary of the types of computers with which embodiments of the invention may be practiced. Typically, the processes of the embodiments, described hereinafter, are resident as software or a program recorded on a hard disk drive (generally depicted as block 110 in FIG. 1) as the computer readable medium, and read and controlled using the processor 105. Intermediate storage of the program and pixel data and any data fetched from the network may be accomplished using the semiconductor memory 106, possibly in concert with the hard disk drive 110.

In some instances, the program may be supplied to the user encoded on a CD-ROM or a floppy disk (both generally depicted by block 109), or alternatively could be read by the user from the network via a modem device corrected to the computer, for example. Still further, the software can also be loaded into the computer system 100 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

Embodiments of the coding method may alternatively be implemented in dedicated hardware such as one or more integrated circuits performing the functions or sub-functions of the encoding, decoding or signalling processes. Such dedicated hardware may include ASICs and associated on-chip memories.

First Embodiment

Figure 2:
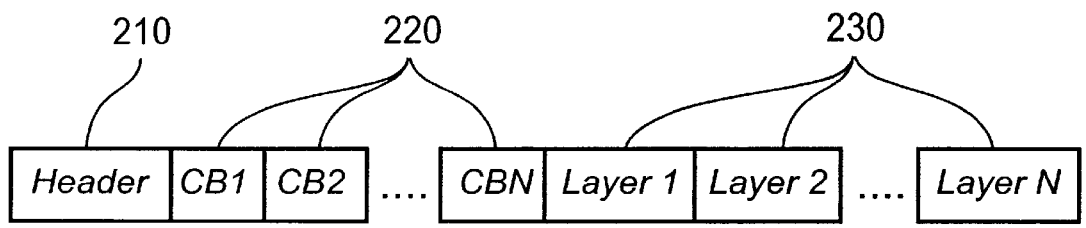
FIG. 2 is a diagram illustrating an example of a file format according to an embodiment of the present invention.
Figure 3:
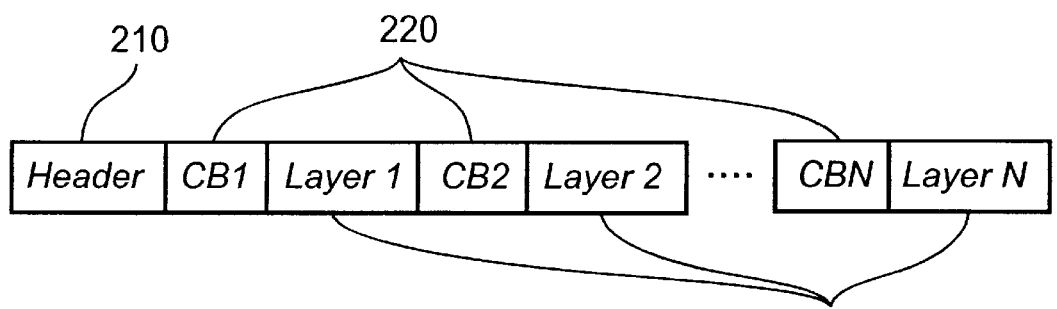
FIG. 3 is a diagram illustrating another example of a file format according to an embodiment of the present invention.

Two multi-layer image file formats will now be described with reference to FIG. 2 and FIG. 3 of the accompanying drawings. In each example depicted in FIG. 2 and FIG. 3, the start of a file comprises a collection of header information 210 which indicates to a decoder a size of an output display device 114 (see FIG. 1) area upon which layers are to be displayed. For each layer in the file there is an associated control block 220. Denoted in FIG. 2 and FIG. 3 by "CB" followed by a numeral N. The numeral N indicates a correspondence between the Nth control block and the Nth layer. For example, a control block associated with "layer 2" is denoted as "CB2". The control blocks may be collected together into the header region of the file as shown in FIG. 2, in which case their sequence order corresponds to the sequence order of image layers contained in the file. Alternatively, as illustrated in FIG. 3, control blocks may precede each image layer in the file. Image layers may be encoded using standard or proprietary coding schemes or may simply be represented as a sequence of raw pixel values. For example, each layer in the file format can individually be encoded using a Wavelet based encoding scheme or alternatively JPEG (Joint Picture Expert Group) compression can be used on each layer.

Table 1 shows a plurality of information fields, and their associated descriptions, used to implement an embodiment of the present invention.

TABLE 1

| Field | Description |
|---|---|
| x | pixel offset from left edge of an output device display area to the left edge of the corresponding layer |
| y | Pixel offset from top edge of the output device display area to the top edge of the corresponding layer |
| t | The amount of time the display is to be maintained after rendering of the current layer prior to displaying a next layer |
| r | Indicates whether or not the current layer is to be removed (and the display restored to its previous state) prior to displaying a next layer. |
| b | Indicates, next layer to render conditional on n |
| n | Indicates the number of times to follow the branch defined by b prior to displaying the layer in the file, treating the sequentially next layer in the file as the next layer to render. |

Each control block contains a plurality of information fields, each field provides information regarding a layer corresponding to a control block. Referring to table 1, there is outlined a plurality of information fields according to an embodiment of the present invention and a corresponding description for each of the fields shown. Each field is represented in the file using a 32 bit unsigned integer stored so that the most significant byte appears first. Other representations could be used, including variable length representations, without departing from the spirit of the invention.

Figure 4:
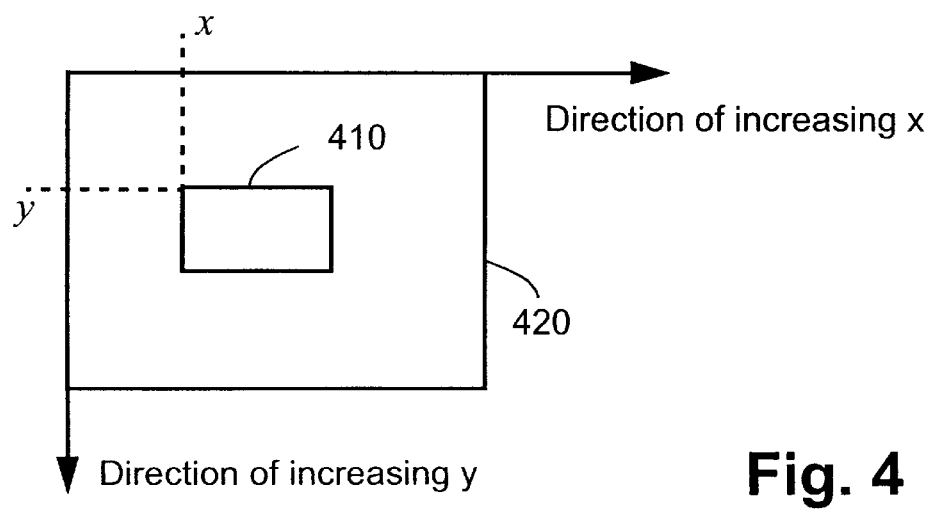
FIG. 4 is a diagram illustrating the axes arrangement used in an embodiment of the present invention.

The first two fields of table 1, x and y are further described with reference to FIG. 4. They indicate a offset from the top left corner of the screen area 420 used to display the image of the top left corner of the corresponding image layer 410. The axis convention assumed is as depicted in FIG. 4.

The third field, t indicates the time that the display is to be maintained after rendering of the current layer prior to displaying a next layer. The units for this field are for example, in $\frac{1}{100}$ths of a second. Thus a + value of 3 th will denote $\frac{3}{100}$ of a second. Alternatively, where synchronisation with other media is required they may be assumed to be in units of timer ticks. A timer tick is an arbitrary (or system defined) unit of time. Ticks are often derived from a synchronisation "track" which forms a part of a separate audio or video data file. Therefore a "t" value of 3 in this alternate representation denotes 3 "ticks" of a synchronisation clock.

The fourth field indicates whether or not a corresponding layer is to be removed (and the display restored to its previous state) prior to displaying a next layer. This field is a boolean field and is assigned a "true" or "false" value depending on whether the output display device 114 is to be or not to be restored to a previous state respectively. If the current layer is to be removed, r=true, then the decoder must store the state of the output display device 114 prior to displaying the current layer. On the other hand, if the layer is not to be removed, r=false then subsequent layers are composited over the top of (all) previously displayed layers.

The fifth and sixth fields (b and n respectively) shown in table 1, implement a looping mechanism. The fifth (b) field indicates a layer to optionally branch to. This is expressed as a number greater than or equal to zero and is interpreted as the number of layers to go back in the file relative to the next layer. This definition results in a value of b=0 indicating the next layer in the file the most "natural" progression. A value of b=1 indicates the current layer—a feature which may be used to extend the display time for the corresponding layer beyond what could normally be specified just using the t field. Thus, a "b" value of 3 (b=3) indicates that the sequence of layers to be displayed must loop back two (2) layers before the current layer and redisplay those layers. This is equivalent to repeating the last three (3) layers, the current layer included. If b is $2^{32}$, or any value greater than the sequence number of the currently displayed layer (in the file) plus 1, then the layer to branch to is defined to be the first layer in the file.

The sixth field of table 1, n, indicates the number of times the branch indicated by the fifth field, should be followed prior to displaying the next layer in the file sequence. A value of $n=2^{32}$ is used to indicate that the branch should be followed indefinitely (until explicitly stopped by user or some other higher level control). A person skilled in the art of programming would realise that $2^{32}$ is the largest value that n can take due to its representation as a 32 bit integer. Other special values could be used without departing from the spirit of the invention.

Figure 5:
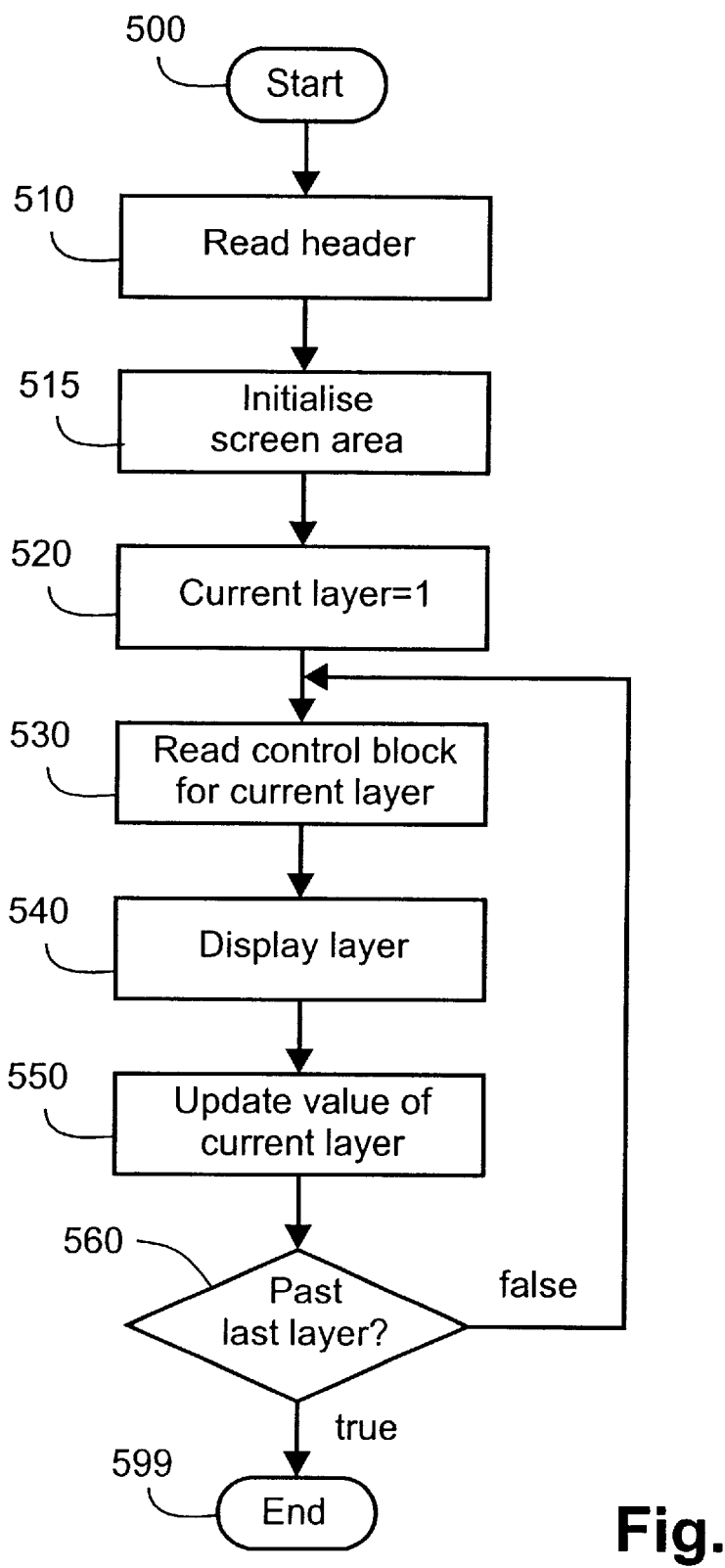
FIG. 5 is a flow chart of the overview of the flow control for a looping mechanism of an embodiment.

FIG. 5 shows a flow chart for the process steps of displaying a multi-layer image according to an embodiment of the present invention. The process starts at block 500. The images file header of a file is read at block 510, which, amongst other information, includes information about the total number of layers. This enables the display area to be determined and initialised at a step 515 for a display device 114 upon which the image data is displayed. A main display loop is initialised at block 520 with the value of a variable denoting a current layer being initialised to 1, a value which indicates the first layer in the file. The display loop commences at block 530 with the reading of a corresponding control block for the current layer and reading the image data for the current layer. At block 540 the image data for the current layer is displayed as prescribed by information from its corresponding control block. The value recorded as the current layer is then updated at block 550. The aim of this step is to establish the index of the layer to be displayed in the next execution of the display loop. Before this can happen the value determined to be the new value for current layer is tested at 560 to determine if it is larger than the total number of layers present in the file then execution terminates at block 599. That is, if control block 560 returns true then the display loop exits to block 599. Otherwise control block 560 returns "false" and control returns to block 530 using the newly established value for current layer.

Figure 6:
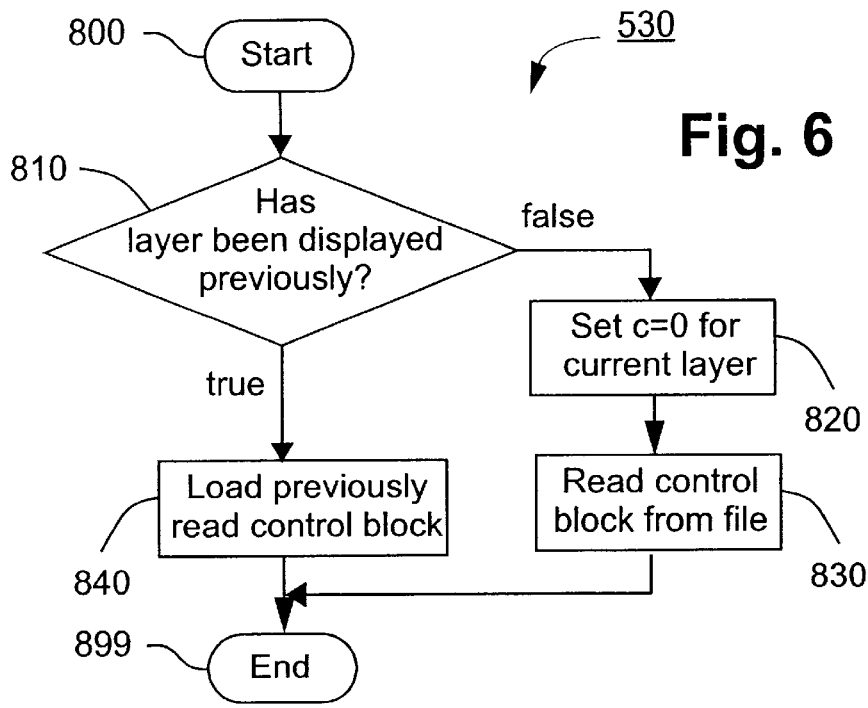
FIG. 6 is a flow chart of the "read control block for current layer" step of FIG. 5 in more detail.

FIG. 6 describes in more detail the processing steps executed in block 530 "Read control block for current layer" of FIG. 5. Processing starts at block 800. At decision block 810 a test is performed to determine whether or not this is the first time that this layer's control block has been read (and hence the first time this layer has been displayed. If control block 810 returns "false", indicating that this is the first time this block has been read and that the layer has not yet been displayed, then a variable c is instantiated for the layer and set to a value of 0 at block 820 before the actual control parameters for that control block are read in at 830 and processing exits to block 899. This c variable is used in later loop calculations hereinafter described with reference to the flow chart shown in FIG. 8. Otherwise decision block 810 returns "true", indicating that the block has been previously read and the layer previously displayed, then previously read parameters for the control block are read at 840 and processing exits to block 899. If block 810 returned true then the value of the variable c is maintained as the same value that entered at start block 800 from a previous loop.

Figure 7:
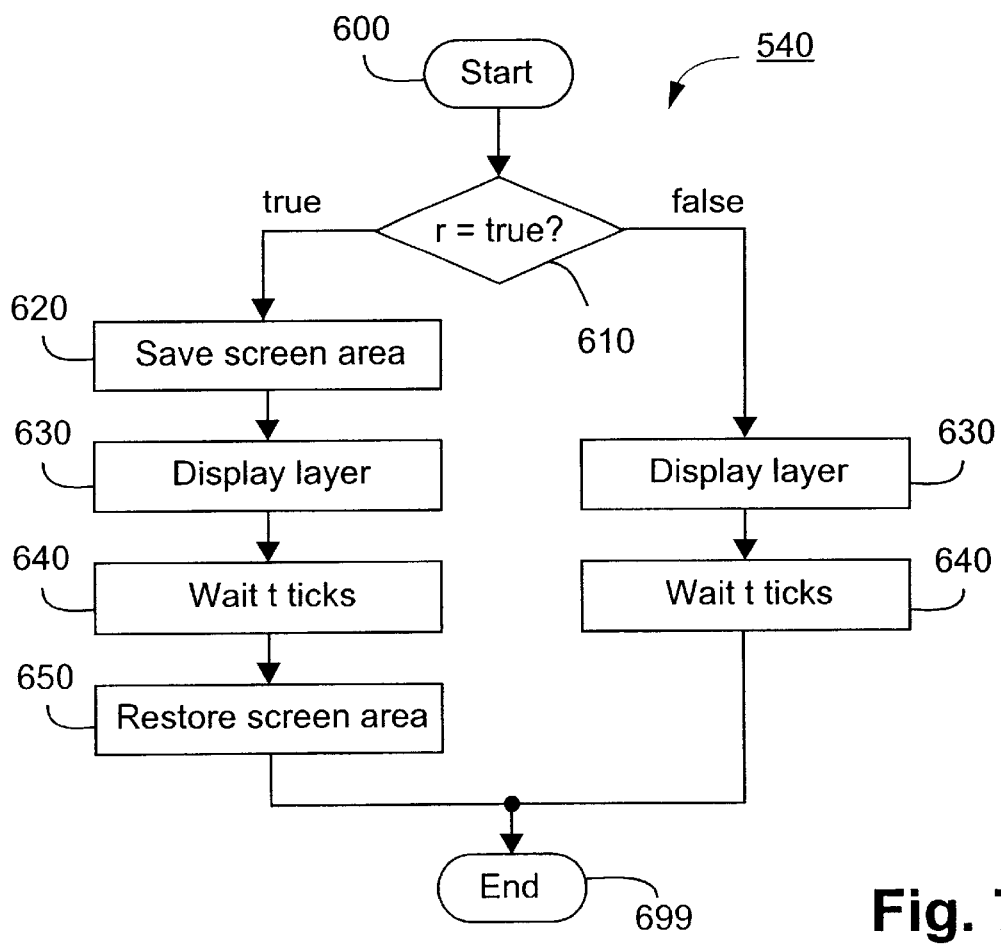
FIG. 7 is a flow chart of the "display layer" step of FIG. 5 in more detail.

Referring to FIG. 7, there is shown in more detail the process step of the display layer block 540 of FIG. 5. The layer display process starts at step 600. At decision block 610 the r parameter (from information field of table 1) from the control block for a current layer is tested to see if its value is "true". If decision block 610 returns "true" then the display area which will be overwritten when the current layer is displayed is saved to an off display storage area at block 620. The layer is then composited over the display area at the point specified by the x and y parameters (from the layer's control block and as depicted in FIG. 4) at block 630. At block 640 a current state of the displayed image is then maintained for a period of time specified by the t parameter (from the layer's control block). The saved screen area is then restored from the off display storage area at block 650 before exiting at block 699. Otherwise, decision block 610 returns "false", no save and restore operations are required. The layer is composited over the display area at the point specified by the x and y parameters (from the layer's control block and as depicted in FIG. 4) at block 630. A current state of the displayed image is then maintained for the period of time specified by the t parameter (from the layer's control block) at block 640 before exiting at block 699. The processing then continues at the next execution block, "update value of current layer" 550 of FIG. 5.

Figure 8:
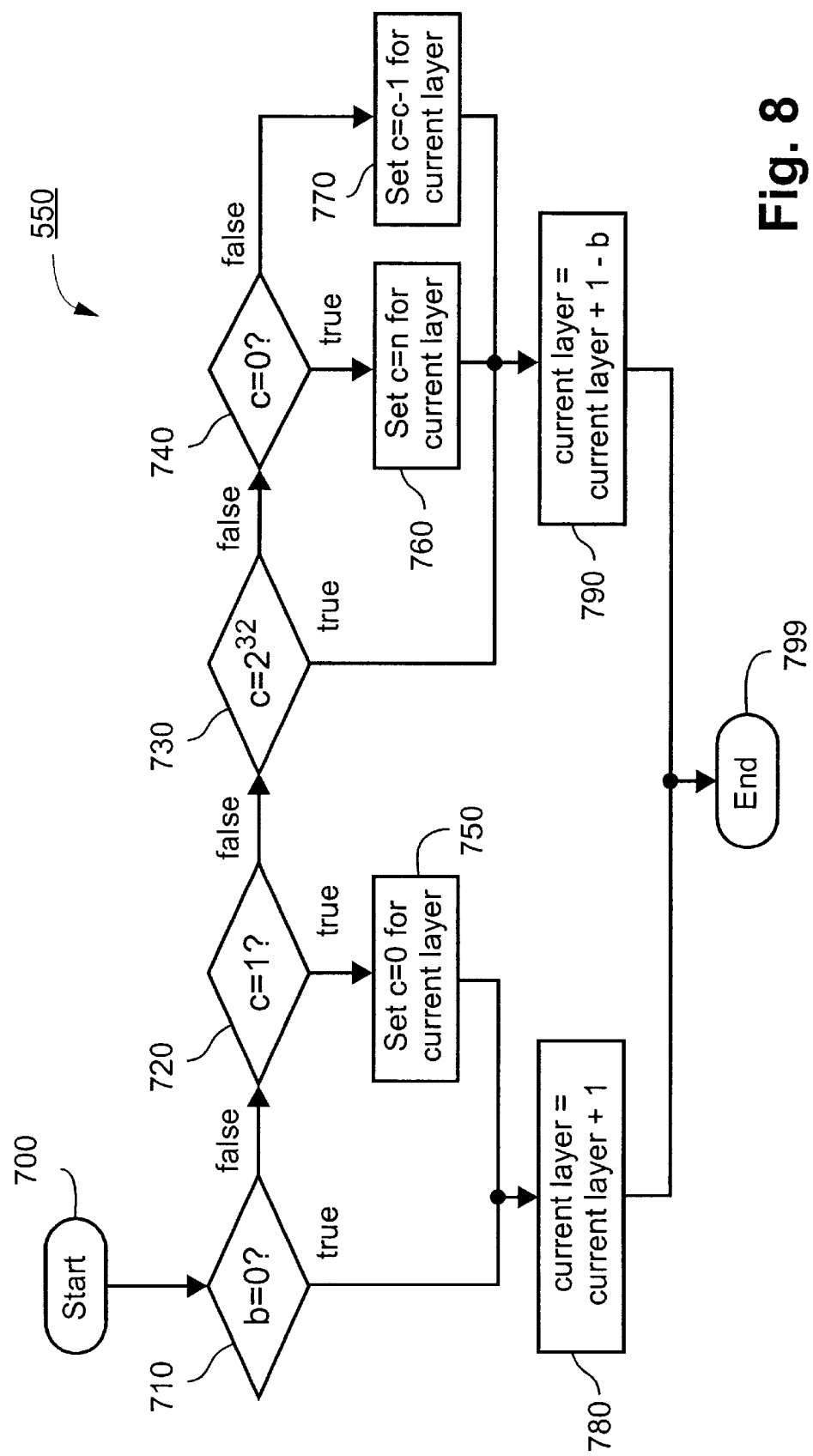
FIG. 8 is a flow chart of the "Update value of current layer" step of FIG. 5 in more detail.

The processing involved in the calculation of the new current layer variable (block 550 of FIG. 5) is described with reference to FIG. 8. The process starts at block 700. At decision block 710 the parameter b (from the current layee's control block) is tested for a zero value. A zero value indicates that a next layer to be displayed is the next layer in the file. If decision block 710 returns "true" then the value of current layer is incremented by one at block 780 and processing exits at block 799. If instead, decision block 710 returns "false" then the value of the current layers variable c is tested for a value of "1" at decision block 720. If control block 720 returns true then the value of the current layer's variable is set to zero at block 750, the value of current layer is incremented at block 780 and processing exits to block 799. If instead, control block 720 returns "false" then the value of the layers c parameter is tested for a value of $2^{32}$ at control block 730. If control block 730 return "true" then the current layer is set to a value of current layer +1−b at block 790 and processing exits to block 799. If instead, control block 730 returns "false" then the value of the layers c parameter is tested for a value of 0 at control block 740. If control block 740 returns "true" then the value of c is set to be equal to the value of the current layer's n parameter (from the layer's control block) in a block 760. Subsequently the current layer is set to a value of current layer +1−b at block 790 and processing exits to block 799. If instead, control block 740 returns "false" then the value of the current layer's c parameter is decremented at block 770. Subsequently the current layer is set to a value of current layer +1−b at block 790 and processing exits to block 799.

Second Embodiment

Figure 9:
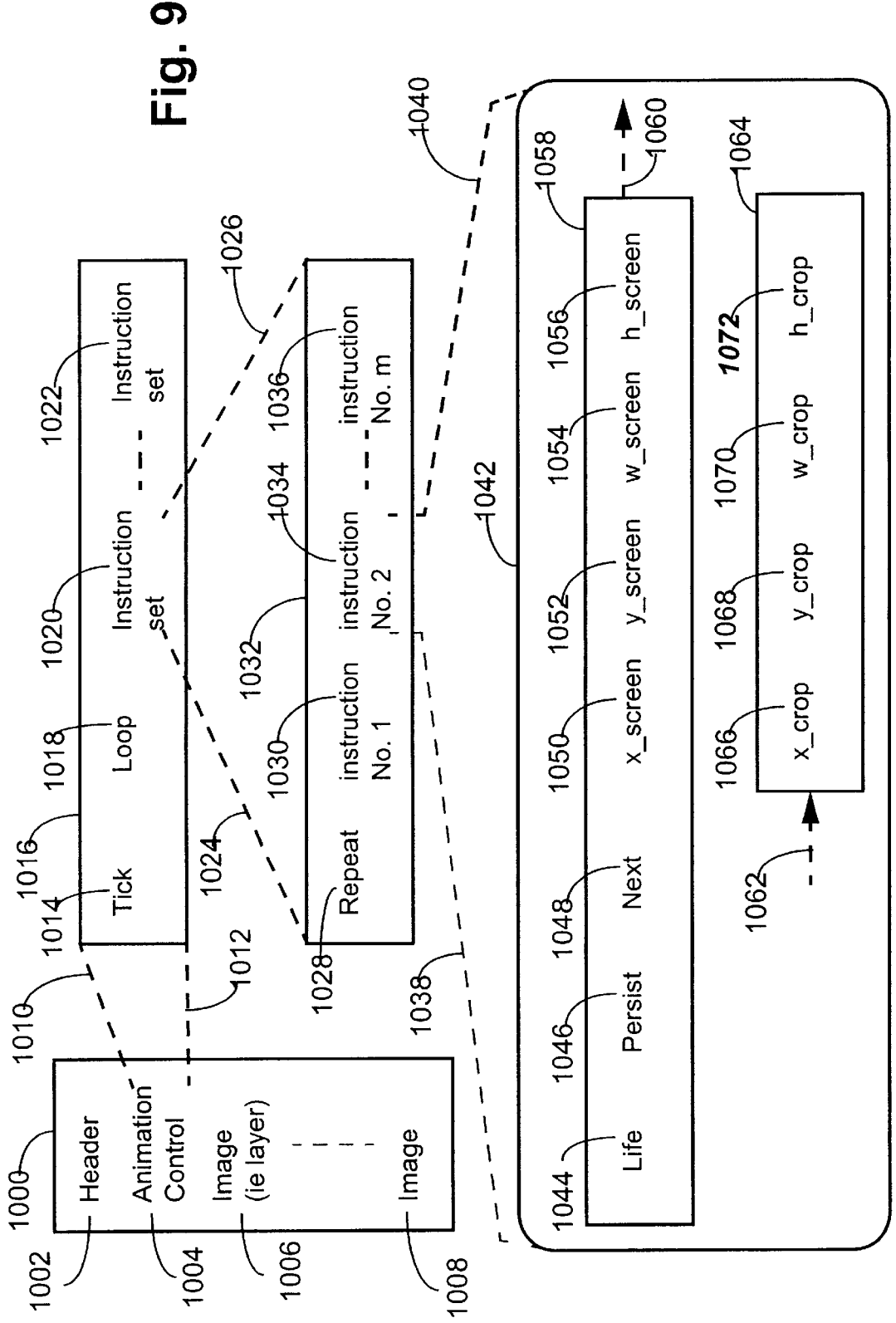
FIG. 9 shows an image file structure in accordance with an embodiment of the invention.

FIG. 9 shows an image file structure in an embodiment of the present invention. The file 1000 comprises a number of elements 1002–1008 packed sequentially into a binary file. Elements early in the the file contain header information 1002 which may include information identifying the file type as well as information describing parameters of the image data contained in the file 1000. An element may also describe an extension to the basic file syntax that is not necessarily understood by all file readers.

In the embodiment, each instruction has identical parameterisation and, as a result, has fixed length. This fact can be used by a file reader to determine the instruction boundaries and, where the length of the instruction set is known, the number of instructions. The animation control block 1004 uses the syntax of the file 1000 in which the block is embedded. Usually this provides a mechanism by which the file reader can determine the starting point and length of the control block 1004 as a whole. Each instruction set, say 1020, (including the leading repeat parameter 1028) is delimited in such a way that the file reader can determine the starting point and length of each set 1020 in a straightforward manner. In the current embodiment, each instruction set is appended to (i) a 32 bit unsigned integer indicating the length of the instruction set and (ii) a 4 byte tag indicating that the ensuing data is a set of animation instructions. This structuring scheme is illustrative, and a different structure, such as a table listing the starting offsets of each instruction set, can equally be used.

The file 1000 contains one or more elements containing image data 1006 or references to image data. There may be several distinct still images 1006–1008 contained or referenced in a file and each of these is referred to as a layer. Some of these layers may be visually incomplete when viewed separately as they are intended to be overlayed on or otherwise combined with other image layers in the file for display purposes. Each is however a complete codestream or set of codestreams, capable of being independently decoded and are still considered distinct within the scope of this description. Animation can be performed using one or more of the image layers 1006–1008, alone or in combination.

Each image layer eg 1006 comprises one or more channels which may be present as one or more codestreams contained in the file 1000, or referenced by the file or derived by mapping image elements through a lookup table. Each codesteam or reference contained in the file 1000 is present in one or more file elements. Information in header elements is used by the file reader to recover the complete codestreams and decode those to image layers.

The channels of each layer comprise arrays of pixel values. These may correspond to samples of colour information specific to a colour space which is defined within header elements 1002 of the file. A single channel may also correspond to intensity samples as in a greyscale image. One or more channels may also contain samples of opacity information for use in rendering other channels in the layer. This channel is commonly referred to as the alpha channel. Alpha channel data may be binary (or bi-level) with each sample taking on only one of two possible values corresponding to fully transparent and fully opaque. Binary alpha data may be encoded with the colour channels by assigning a unique colour to all pixels which are fully transparent.

This specification discloses a method for describing the animation, comprising a file or codestream 1000 containing a header 1002 with global parameters including but not limited to (i) the screen area (eg 1532 in FIG. 10) required to display the animation contained in the file (ii) a block of animation control information 1004 and (iii) a sequence of image layers 1006–1008 encoded using any appropriate method.

The animation control information 1004 (also referred to as the animation control block) comprises, as shown in an expanded view 1016, an integer 1014 denoted "tick" defining the duration of a timer tick. The animation control information 1004 also contains an integer 1018 denoted "loop" defining the number of times the animation as a whole should be displayed. The animation control information 1004 further contains one or more sets 1020–1022 of frame control instructions. The structure of the animation control block 1004 is described with reference to Table 2.

TABLE 2

Fields contained in the animation control block with descriptions.

| Field tag | Encoding | Description |
| --- | --- | --- |
| Tick | 16 bit unsigned integer | The duration in milliseconds of the default timer tick used for interpreting timing instructions. Other temporal measures could be used eg. ticks per second. |
| Loop | 16 bit unsigned integer | The number of times to repeat the display of this animation in its entirety. A value of $2^{16}$ indicates that the decoder should repeat the animation indefinitely or until stopped by an external signal. |
| Instruction sets | See Table 2. | Collections of animation instructions |

A predetermined value of "loop" 1018 can be used to ensure that the animation be repeated an indefinite number of times.

Each of the sets 1020–1022 of frame control instructions comprises, as shown in an expanded view 1032, a leading integer 1028 denoted "repeat" indicating the number of times the associated set of instructions 1030–1036 should be executed, and a set of instructions which are to be executed by the reader in sequential order. A predetermined value of "repeat" is used to ensure that the animation instruction sequence is executed an indefinite number of times. Table 3 encapsulates the form of the instruction sets 1020–1022.

TABLE 3

Fields contained in each of the "Instruction sets" of the animation control block, with descriptions.

| Field tag | Encoding | Description |
| --- | --- | --- |
| Repeat | 16 bit unsigned integer | The number of times to repeat the execution of the ensuing animation instructions. |
| Instruction $_m$ | See table 3. | Animation instructions |

Each instruction say 1034 comprises, as shown in an expanded view 1042 (which comprises two sections 1058 and 1064 in tandem, as depicted by dashed arrows 1060, 1062) an integer 1044 denoted "life" defining the number of timer ticks that should (ideally) occur between completion of execution of the current instruction and completion of execution of the next instruction. The instruction further comprises a binary flag 1046 denoted "persist" defining whether the pixels rendered to screen as a result of execution of the current instruction should appear to persist on the display background or appear to be reset to the pre-execution background. Furthermore, an integer 1048 denoted "next" defines the number of instructions to execute before reusing the current layer where a value of zero implies that the layer shall not be reused for any ensuing instructions notwithstanding execution of a global loop as a result of a non-zero "loop" control.

The first instruction 1030 acts upon the first layer 1006 in the file 1000, and each subsequent instruction acts on the layer specified for that instruction in the "next" field of a previous instruction, or, in the case that no such specification has taken place, the next layer sequentially in the file.

A zero value for "life" (ie 1044) and a false value for "persist" (ie 1046) indicates that the layer being acted upon by that instruction is not rendered in any way by that instruction.

A zero value for "life" (ie 1044) and a true value for "persist" (ie 1046) indicates that the layer being acted upon by the current instruction is to be considered as part of a frame definition sequence. Such a sequence is terminated upon execution of the next instruction with a non-zero value for "life". Termination of the frame definition sequence results in the composition and display of all of the layers acted upon by the frame definition sequence in such a way that the "persist" and "life" values for the terminating instruction are applied collectively. From a display perspective, all the instructions in a frame definition sequence should appear to be executed as a single instruction.

A predetermined maximum value of "life" (ie 1044) is used to imply that the animation be suspended indefinitely after execution of that instruction. In such cases, execution may be continued as a result of some higher interaction level.

Each instruction (1030) can additionally include an integer pair 1050, 1052 denoted "(x,y)" defining the location to place the top left corner within the display area for the whole image of the layer being acted on by this instruction. The instruction 1030 can also include an integer set 1066–1072 denoted "(Cx, Cy, Cw, Ch)" defining the top left corner, width and height of a region to crop from the layer being acted on by this instruction. The cropped region is considered to replace the layer being acted upon within the scope of this instruction only.

Each instruction can additionally include an integer pair 1054, 1056 denoted "(w,h)" defining the width and height of the region within the display area into which the layer being acted upon by this instruction should be rendered. This step includes resampling of the layer if the width and height of the layer are different to the values specified in the instruction. The form of the instructions 1034–1036 is set out in Table 4.

TABLE 4

Fields contained in the instruction$_m$ fields of the animation control block with descriptions.

| Field tag | Preferred encoding | Description |
|---|---|---|
| Persist | 1 bit flag | Boolean flag indicating whether the pixels rendered to screen as a result of execution of the current instruction should appear to persist or appear to be reset to the pre-execution background after the instruction's life has expired. |
| Life | 15 bit unsigned integer | The number of timer ticks to aim to place between the completion of this instruction and the completion of the next instruction. |
| Next | 32 bit unsigned integer | The number of instructions to execute (including the current instruction) before reusing the current image layer. A value of zero implies the layer shall not be reused for any ensuing instructions notwithstanding execution of a global loop as a result of a non-zero "loop" control. |
| x_screen | 32 bit unsigned integer | Distance in screen pixels from the left edge of the display area to place the left edge of the layer being acted on by this instruction. |
| y_screen | 32 bit unsigned integer | Distance in screen pixels from the top edge of the display area to place the top edge of the layer being acted on by this instruction. |
| w_screen | 32 bit unsigned integer | Width of the display area in screen pixels into which to scale and render the layer being acted on by this instruction. |
| h_screen | 32 bit unsigned integer | Height of the display area in screen pixels into which to scale and render the layer being acted on by this instruction. |
| x_crop | 32 bit unsigned integer | Distance in image pixels to the left edge of a crop region within the layer being acted on by this instruction. |
| y_crop | 32 bit unsigned integer | Distance in image pixels to the top edge of a crop region within the layer being acted on by this instruction. |
| w_crop | 32 bit unsigned integer | Width in image pixels of a crop region within the layer being acted on by this instruction. |
| h_crop | 32 bit unsigned integer | Height in image pixels of a crop region within the layer being acted on by this instruction. |

The interpretation of the instruction parameters is further explained with reference to FIG. 10.

Figure 10:
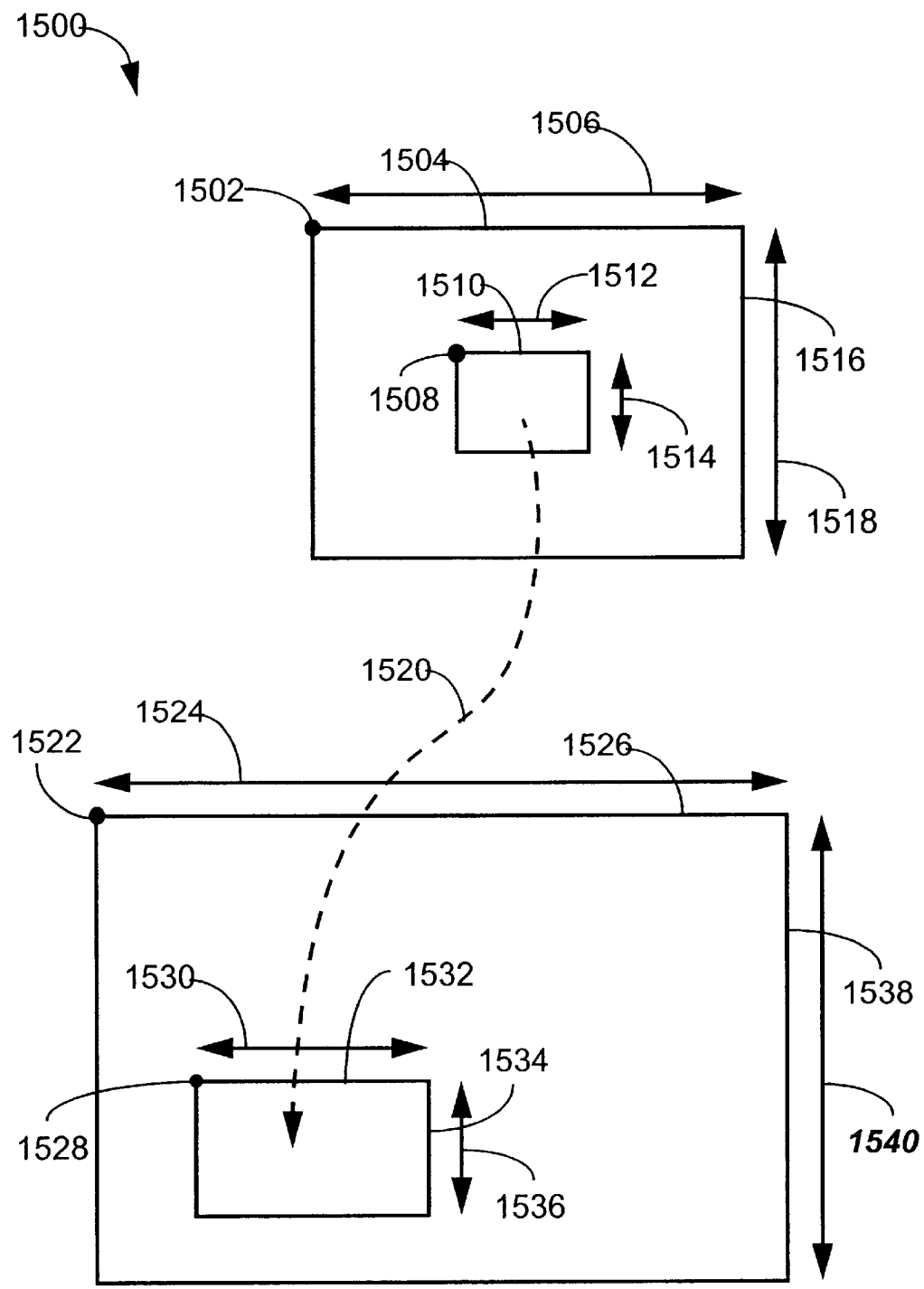
FIG. 10 shows a virtual screen, upon which a segment of a layer is to be rendered.

FIG. 10 shows a virtual screen 1526, upon which a cropped segment 1510 of a layer 1504 is to be rendered, the performance of rendering being depicted by a dashed arrow 1520. The virtual screen 1526 has a width 1524, and a height 1540, these dimensions being referred to an (x,y) origin 1522 depicted by a dark dot. A segment 1532 of the virtual screen 1526, to which a segment 1510 of a layer 1504 is to be rendered, has a width 1530, and a height 1534, denoted respectively by 1054 and 1056 in FIG. 9, these dimensions being referred to an (x,y) origin 1528, denoted 1050, 1052 in FIG. 9. The segment 1510 of the layer 1504 which is to be rendered onto the virtual screen 1526, has a width 1512, and a height 1514, denoted respectively by 1070 and 1072 in FIG. 9, and these dimensions being referred to an (x,y) origin 1508 denoted by 1066, 1068 in FIG. 9. The layer itself 1504 has a width 1506 and a height 1518, these dimensions being referred to an (x,y) origin 1502.

Figure 11:
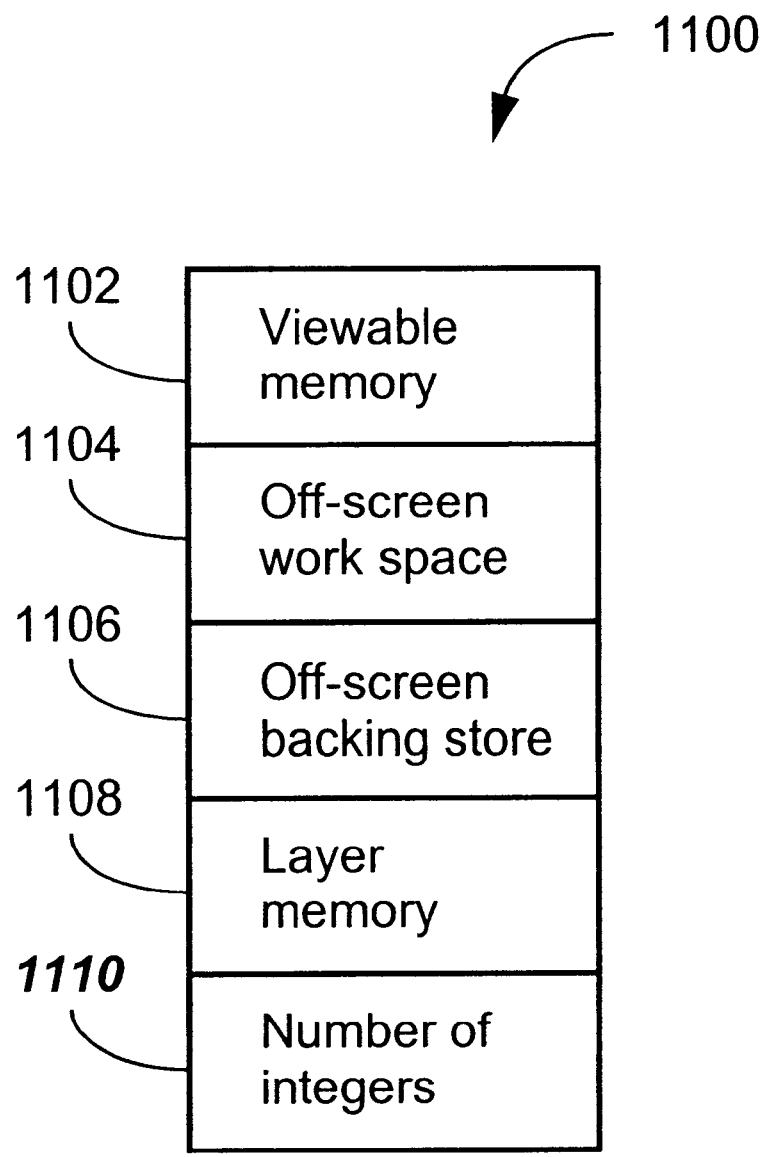
FIG. 11 shows an memory arrangement to support displaying animated image sequences in accordance with an embodiment of the invention.

FIG. 11 shows a memory arrangement 1100 for displaying animated image sequences. The memory comprises a viewable memory region 1102 having a capacity equal in size to a screen area defined in the file header 1002, and an off-screen working space 1104, at least equal in size to the largest area that is to be rendered to screen at once (resulting from the execution of a single instruction or the final instruction of a frame definition sequence). The memory further comprises an off-screen backing store 1106, which is again at least equal in size to the largest area that is to be rendered to screen at once (resulting from the execution of a single instruction or the final instruction of a frame definition sequence). The memory further comprises storage 1108 for a list of layers referred to as the "layer memory" which can be used to retrieve a decoded version of any layer explicitly placed in that list. The apparatus further comprises storage 1110 for a list of integers corresponding to the entries in layer memory and containing the number of instructions still to be executed before the corresponding layer (in layer memory) is to be acted upon.

Figure 12:
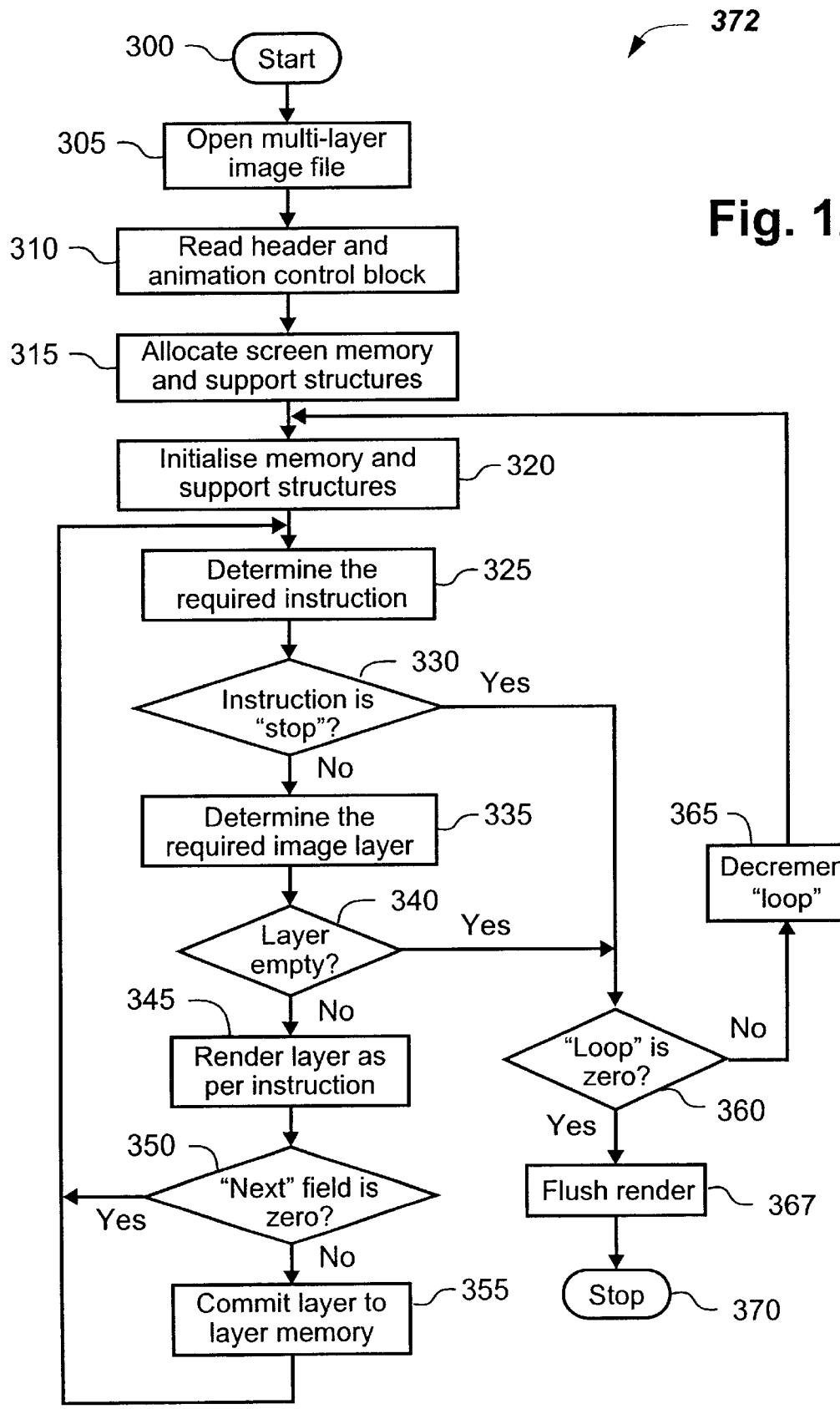
FIG. 12 is a flow diagram of method steps, showing an animation process in accordance with an embodiment of the invention.

FIG. 12 shows a top level of execution of an embodiment 372 of the animation process. Execution commences at a step 300. A multi-layer file (1000, see FIG. 9) is opened at a step 305, and header and animation control information is read in a step 310, this being described in greater detail with reference to FIG. 13. The header information is used to allocate display resources and support structures in a step 315, this being described in greater detail with reference to FIG. 14. The memory and support structures are initialised in a step 320, this being described in greater detail with reference to FIG. 15. Determination of required instructions is performed in a step 325, which is described in greater detail with reference to FIG. 16. Determination of a required image layer is performed in a step 335, which is described in greater detail with reference to FIG. 17. Rendering a layer in accordance with an instruction is performed in a step 345, which is described in greater detail with reference to FIGS. 18(*a*) and 18(*b*). Flushing of the rendered rectangle to the screen is performed in a step 367, which is described in greater detail with reference to FIG. 19.

The main animation loop of the process 372 begins in a step 325. In this step, the player determines the display instruction to use from the sets of instructions provided in the animation control block. The determined instruction is tested in a step 330 to determine if the instruction has a special value indicating that no further instructions are available. This special value is denoted "stop". If an instruction other than "stop" is found, execution of the process 372 moves to a step 335, where the player determines the image layer which is to be acted upon by the instruction. The determined layer is tested in a step 340, to determine if the determined layer has a special value, denoted "empty", indicating that no layer could be found.

If there is a layer to use, execution of the process 372 moves to a step 345 where the layer is rendered in accordance with the instruction. In a following step 350, the "next" field of the instruction is tested for a non-zero value which would indicate that the layer is to be used again. If a non-zero value is found then the layer, and the value of the "next" field, are committed to a layer memory at a step 355. The layer memory can take several different, but functionally equivalent forms for the purpose of implementation. In one embodiment, each entry in the layer memory stores the decoded image samples. In another embodiment, the compressed codestream is retained in the layer memory. In a further embodiment, a pointer to the first byte of the layer in the file is stored along with any auxilliary data required in order to read and decode the data. In all cases, the layer memory provides sufficient information to permit the reader to regenerate the pixels of the layer stored therein at some future time.

If the "next" field (ie. 1048) of the current instruction is zero, this implying that the layer is not needed after execution of this instruction, then any memory associated with maintaining that layer's pixel data or decoder state can be freed. In either case, execution of the process 372 subsequently returns to a step 325 where the next instruction is determined, then next layer is determined and rendered and so on.

If at any stage there is no instruction found (ie the step 330 which tests if "instruction is "stop"" returns a "yes" value), or no layer found (ie the step 340 which tests if "layer is "empty"" returns a "yes" value), then the animation sequence 372 is assumed to have finished, and execution moves to step 360.

If the value of the loop field, tested for at step 360, is zero, then execution of the animation process 372 terminates. However, if the last instruction executed had a zero life field, then there may be undisplayed image data waiting to be rendered in the render image. To logically complete the animation (or alternatively, the still composition) the rendered rectangle of the render image is flushed to screen at a step 367, prior to exiting to the step 370. In an alternate embodiment, the flushing step 367 can be performed prior to the decision step 360. If the loop field is non zero at the step 360, then the loop field value is decremented at a step 365 before re-initialising memory and support structures (at the step 320) and restarting the animation loop.

Figure 13:
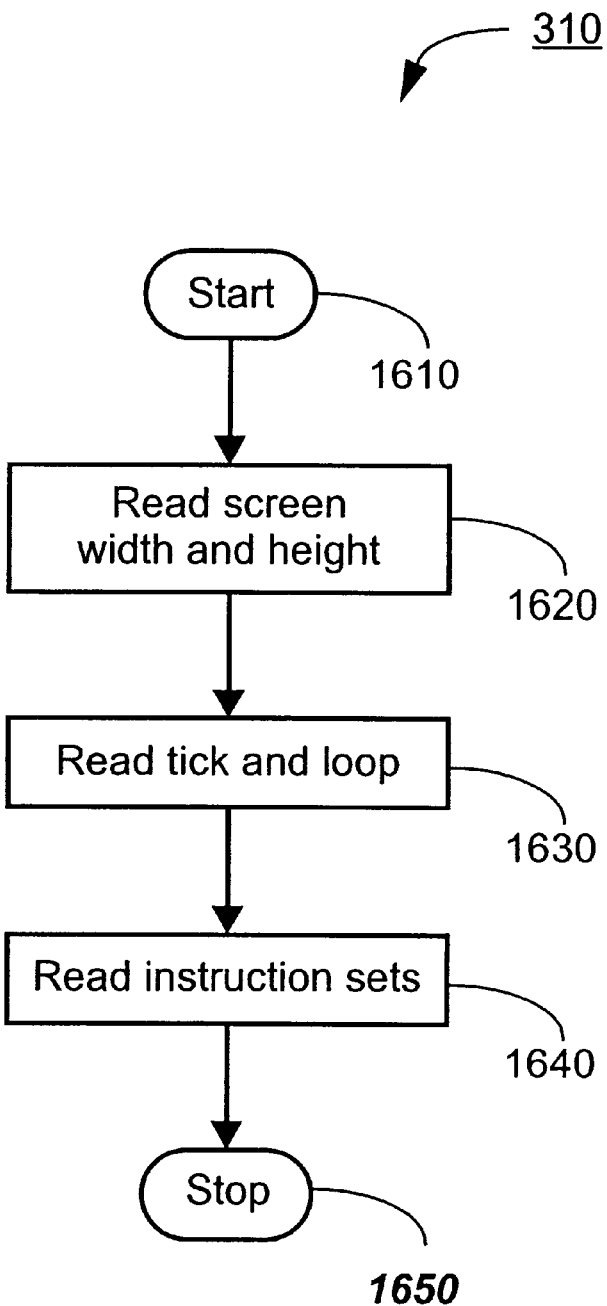
FIG. 13 is a flow diagram of method steps relating to the step of reading header and animation control block information in FIG. 12.

Step 310 of FIG. 12 is described in detail with reference to FIG. 13. Execution starts at a step 1610. In a subsequent step 1620, a width and height of the screen area used to render the animation is read, along with other header information important to the recovery of image data from the file. Only the width and height parameters play an integral role in the animation process however. In a following step 1630, top level animation controls are read, these including "tick" and "loop" parameters, as defined in Table 1. Subsequently, in a step 1640, the animation instruction sets are read. In practice, the instruction sets may be read in full, or a pointer into the file maintained for reading during execution of the main animation loop may be read. The header information 1002 as described in relation to FIG. 9 represents only the required minimum set of header information required to implement the embodiment. Other embodiments may incorporate arbitrary additional header information. Finally, execution exits at a step 1650.

Figure 14:
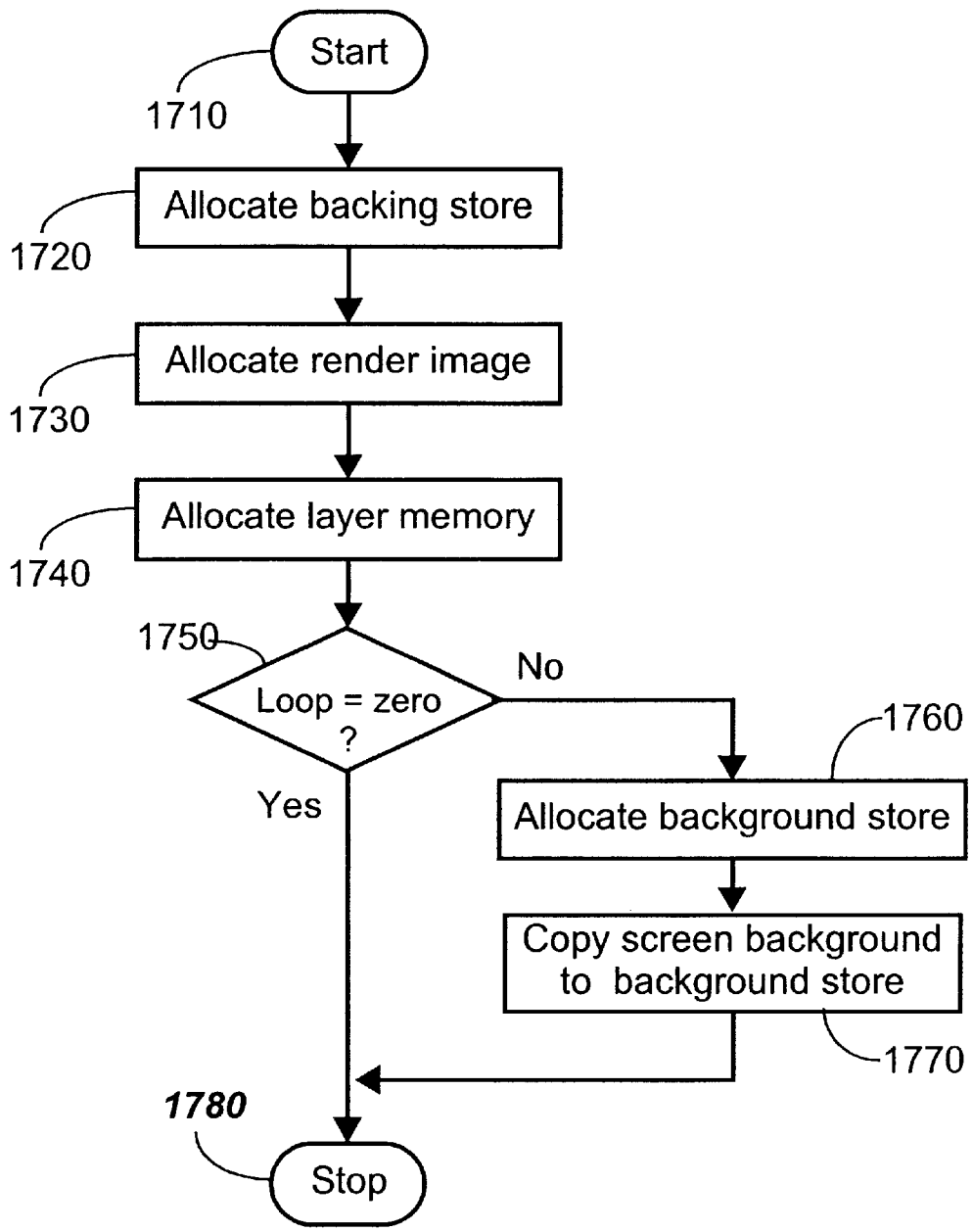
FIG. 14 is a flow diagram of method steps relating to the step of allocation of screen memory and support structures in FIG. 12.

Step 315 of FIG. 12 is described in detail with reference to FIG. 14. Execution starts at a step 1710, and proceeds based on information read from the file 1000 (see FIG. 9) at the step 310 of FIG. 12. At a step 1720, memory is allocated for a backing store. The purpose of the backing store is to store areas of the screen that must be restored after the display of non persistent frames, i.e. where the persist field of the animation instruction has the value "false". The size of the backing store can be calculated by parsing the instructions, to determine the largest area that will require restoring. Alternatively, the backing store can simply be made the same size as the screen area used to display the animation. No instruction parsing is required in this latter case.

If the animation contains only persistent frames, then no backing store is required, and the step 1720 has no effect. It is noted that information regarding the backing store size can be stored as part of the file header. At a step 1730, memory is allocated for a render image. The purpose of the render image is to act as an off-screen working space in which frames can be composed prior to being copied to screen memory. In the embodiment, the render image is the same size as the screen area used to display the animation. In practice the render image can be smaller, but will usually be at least the same size as the largest screen area updated at any one instant, this being the size of the largest "rendered rectangle" resulting from execution of the instructions. Alternatively, this can be considered in terms of being at least equal in size to the largest area that is to be rendered to screen at once (resulting from the execution of a single instruction or the final instruction of a frame definition sequence).

It is noted that allocation of a background store is not required if the first layer of the file is fully opaque, and covers the entire image display area (which is specified by the width and height fields of the header). In addition, the backing store is not required if all of the instructions in the animation control block have a persist value of "true". At a step 1740, memory is allocated for the layer memory. Layer memory serves a dual purpose, in that it provides a cache for image data that has already been decoded and rendered but is going to be reused in subsequent frame, and it also provides the mechanism for tracking when the layers contained therein are to be re-used.

To achieve these aims, each entry in layer memory comprises a handle by which the image data for that layer may be retrieved and a variable labelled "next" which records the number of instructions to be executed before reusing the layer.

Finally, at a step 1750, a test is performed to determine if the value of the "loop" field in the animation control block is zero. If this is false (i.e. the step 1750 returns a "no") then the entire animation sequence 372 (see FIG. 12) is to be repeated. In order to support this, an additional background store is allocated at a step 1760 and the initial screen background is copied to this background store in a step 1770. If the value of "loop" is zero (i.e. the step 1750 returns "yes") then there is no need for this background store structure, and execution exits directly to a step 1780.

Figure 15:
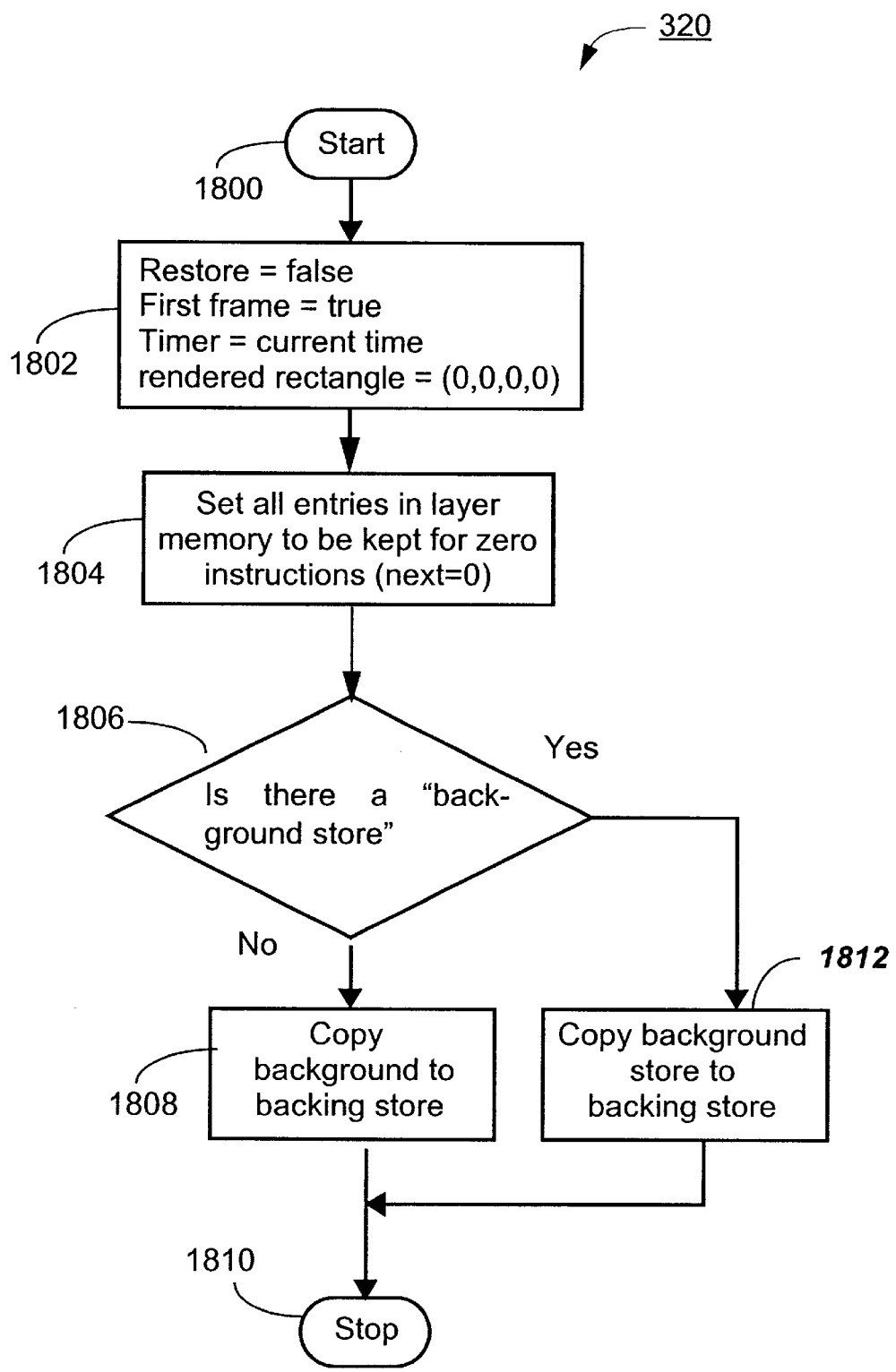
FIG. 15 is a flow diagram of method steps relating to the step of initialisation of memory and support structures in FIG. 12.

Step 320 of FIG. 12, is described in detail with reference to FIG. 15. Execution starts at a 1800, and at a step 1802, a number of variables are intialised. Specifically, "restore" is set to "false". This variable indicates when background should be restored from the backing store. The value of "first frame" is set to true, indicating that the first frame of the animation sequence is about to be processed. The "timer" is initialised with the current time. This variable is used to determine the time at which individual frames of the animation sequence should appear on screen. Finally a variable labelled "rendered rectangle" is initialised to contain four zeros The rendered rectangle contains the origin (x and y) and size (width and height) of the region in the rendered image that has changed relative to the on-screen display. This is used during screen updates.

At a step 1804, each item in the layer memory is visited, and the items "next" field reset to a value of zero. This value is intended to ensure that the associated image handle will be freed. In a step 1806, a test is performed to determine if a background store is being used, which would imply that the animation sequence 372 (see FIG. 12) is looped at least once. If step 1806 returns "no", then the screen image can simply be copied to the backing store in a step 1808. If the step 1806 returns a "yes", then the copy of the background contained in the background store must be used, since the screen background may be corrupted with the output from a previous loop execution. This is copied to the backing store at a step 1812. Either way, execution then exits to a step 1810.

Figure 16:
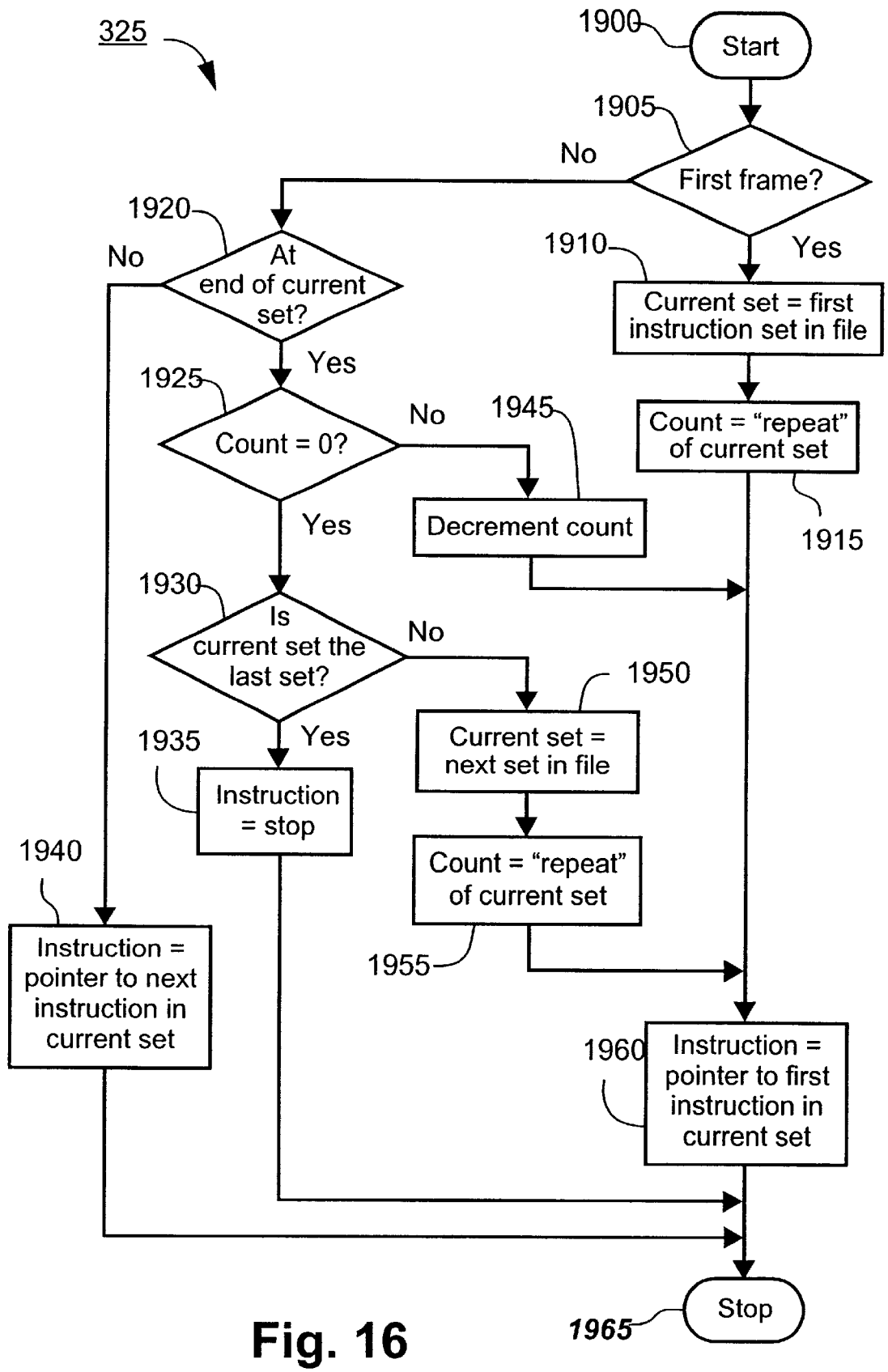
FIG. 16 is a flow diagram of method steps relating to the step of instruction determination in FIG. 12.

Step 325 of FIG. 12 is described in detail with reference to FIG. 16. Execution begins at a step 1900. At a following step 1905, a test is performed to determine if the value of the "first frame" variable is true, which indicates that the animation process 372 (see FIG. 12) is at the very beginning of the animation sequence. If step 1905 returns "yes", then a "current set" variable is set to point to the first set of instructions defined in the animation control block at a step 1910, and at a following step 1915, the variable "count" is initialised to the value of the repeat field in the aforementioned current set. At a step 1960, the variable "instruction" is set to point to the first instruction in the current set before execution exits at a step 1965.

If the step 1905 returns a "no", indicating that a frame subsequent to the first frame is being animated, then a number of additional tests are required in order to determine which instruction should be used. At a step 1920, a test is performed to determine if "instruction" already points to the last instruction in the current set. If the step 1920 returns a "no", indicating that the end of the current set has not been reached, then "instruction" is incremented, in a step 1940, to point to the next instruction in the current set in sequence order, prior to exiting at the step 1965.

If the step 1920 returns a "yes", indicating that the last instruction in the current set has been performed, then the count variable is tested at a step 1925 to determine if the count variable is zero. If the step 1925 returns a "no", indicating that the instructions in this set should be repeated, then the value of "count" is decremented in a step 1945, "instruction" is set to point to the first instruction in the current set in the step 1960, and execution subsequently exits to the step 1965.

If the step 1925 returns "yes", indicating that any repeats of this instruction set have been completed and that execution should continue with the first instruction of the next instruction set, then a test is performed at a step 1930 to determine if the current set is the last instruction set defined in the animation control block. If step 1930 returns "yes"— indicating that the current set is the last set—the variable "instruction" is set to a special predetermined value indicating that no further instructions are available. In FIG. 16 this value is denoted "stop". If the step 1930 returns "no", indicating that there are more instruction sets defined by the animation control block still to be processed, then the variable "current set" is set to point to the next instruction set in sequence order at the step 1950, and the variable "count" is initialised to the value of the "repeat" field for that instruction set in a step 1955. Subsequently, the variable "instruction" is set to point to the first instruction in the new current set at the step 1960 before execution exits at the step 1965.

Figure 17:
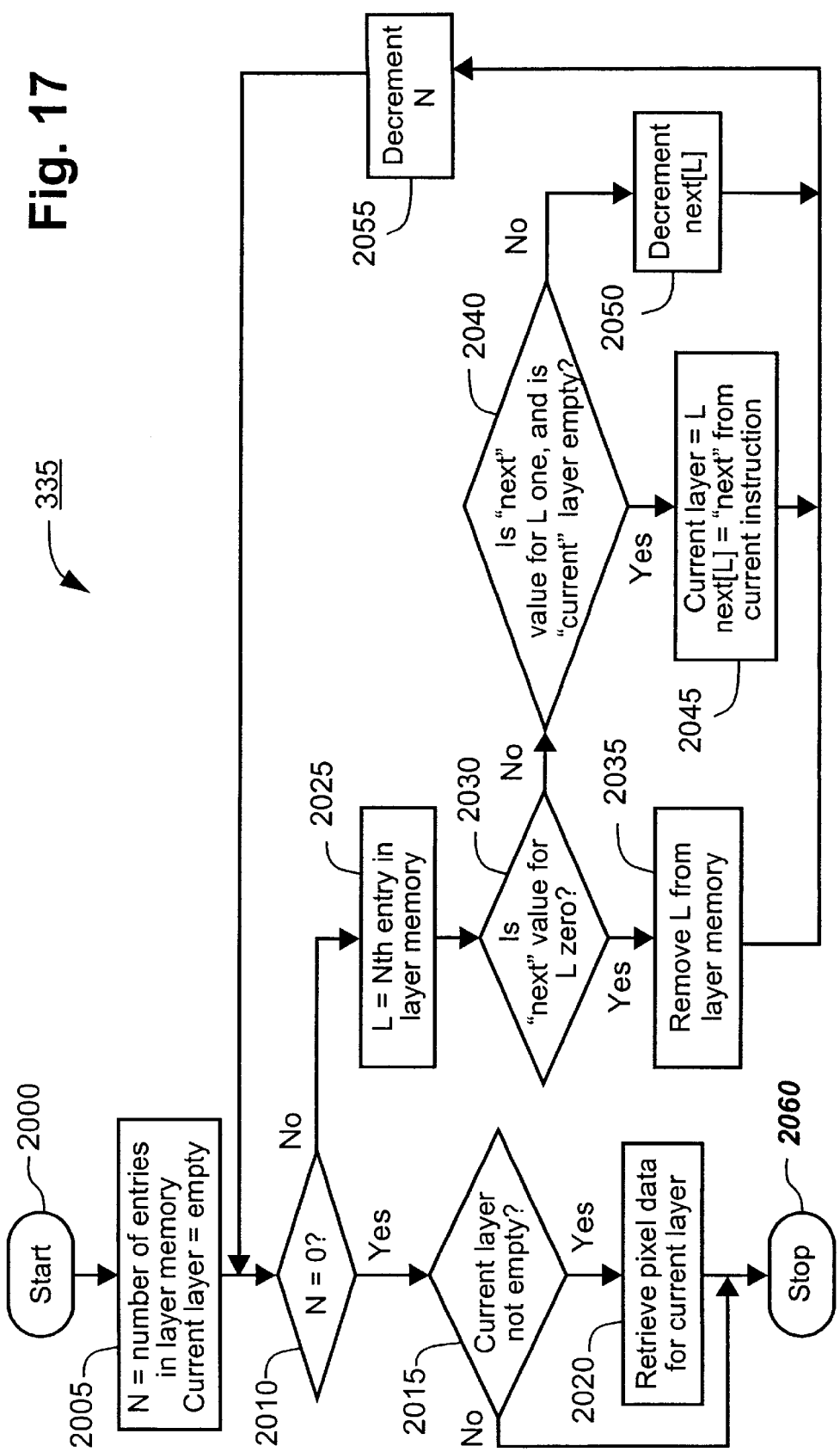
FIG. 17 is a flow diagram of method steps relating to the step of determination of image layer in FIG. 12.

Step 335 of FIG. 12 is described in detail with reference to FIG. 17. Execution starts in a step 2000. In a following step 2005, a variable labelled "current layer" is initialised to a special value denoted "empty" and a variable labelled "N" is initialised to the number of entries in the layer memory. This variable (N) is used in subsequent loop instructions to process each entry in the layer memory. The loop execution starts in a following step 2010, where a test is performed to determine if the value of "N" is zero. If the step 2010 returns "yes", then the loop exits, and the process 335 is directed to a step 2015 where a test is performed to determine if the value of "current layer" has been set to something other than the special value of "empty". If the step 2015 returns "yes", then the pixel data associated with the current layer is retrieved in a subsequent step 2020. In either case, execution subsequently exits to a step 2060.

If the step 2010 returns "no", indicating that not all entries in the layer memory have been visited, then the main body of the loop is executed. At a step 2025, a variable L is set to point to the Nth entry in the layer memory. At a subsequent step 2030, the value of the "next" field in that entry is tested to see if its value is zero. If the step 2030 returns "yes", then the layer is removed from layer memory at step 2035. This is a cleanup step. If the step 2030 returns "no", then a test is performed at a following step 2040 to determine if the value of the "next" field of entry "L" is equal to one and the value of current layer is equal to the special value denoted "empty".

If the step 2040 returns "yes", then the current layer is set to the layer contained in the entry "L", and the "next" field in that entry is set to the value of the "next" field in the current instruction. The value of "N" is subsequently decremented in a step 2055, and execution of the process 335 loops back to the step 2010. If the step 2040 returns no then the value of the next field in the entry "L" is decremented, in a step 2050, prior to decrementing "N" at the step 2055 and looping back to the step 2010.

Figure 18A:
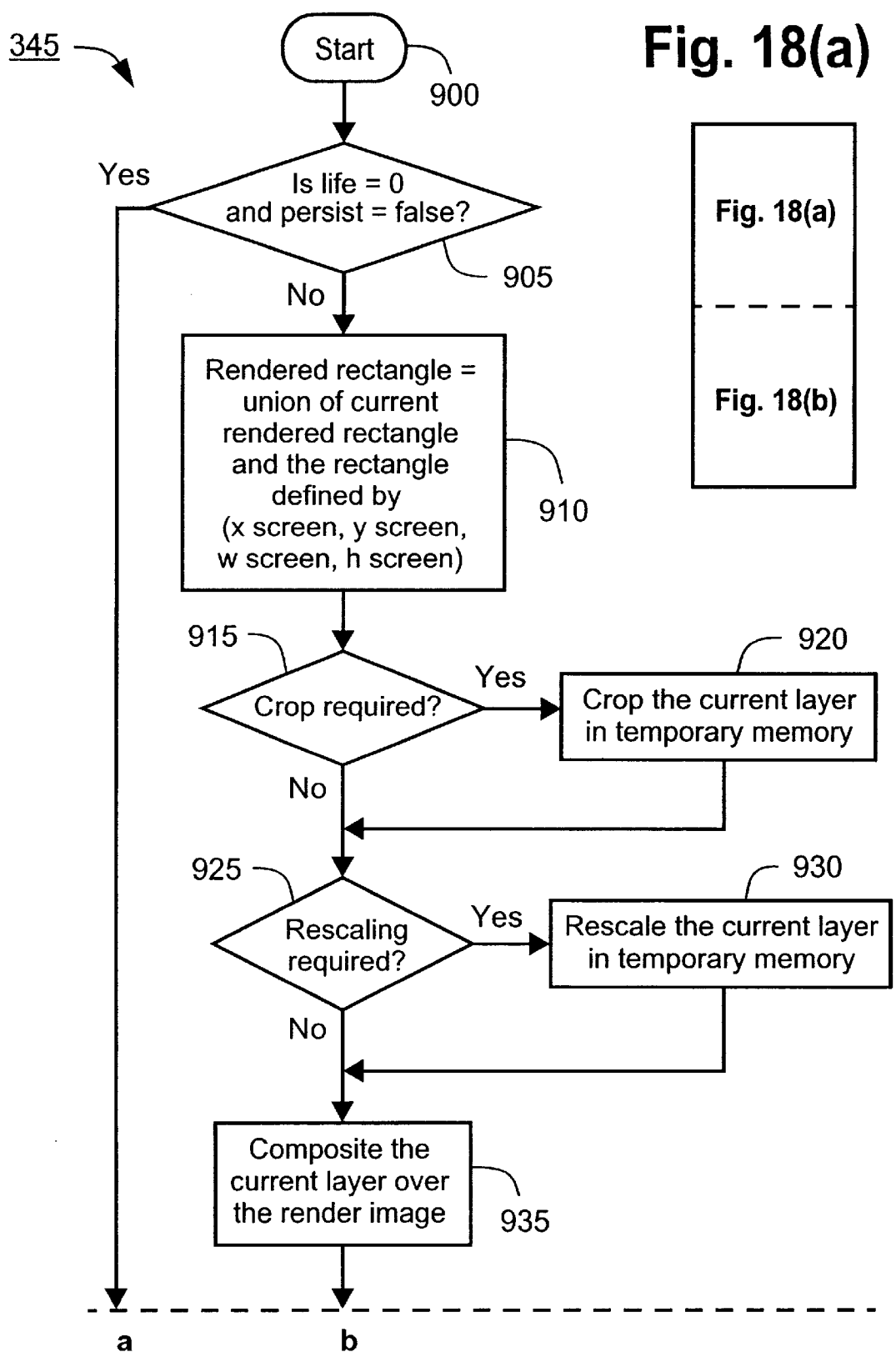
FIG. 18 is a flow diagram of method steps relating to the step of rendering of image layers in FIG. 12.

Step 345 of FIG. 12 is described in detail with reference to FIGS. 18(a) and 18(b). Execution starts at a step 900 in FIG. 18(a). A following step 905 tests for the special case of a non-persistent frame with zero life. If the step 905 returns "yes", indicating that this condition exists, then execution of the process 345 immediately exits to a step 995 (see FIG. 18(b)). If the step 905 returns "no", then the value of the rendered rectangle is updated in a following step 910, to contain the union of the rendered rectangle current value and the screen rectangle defined by the current instruction. At a following step 915, a test is performed to determine if a crop operation is required by the current instruction. If the step 915 returns "yes", indicating that the crop operation is required, then in one embodiment, the current layer is replaced, only for the scope of the current instruction, with the cropped region at a step 920. In either case, execution then moves to a following step 925.

At the step 925, a test is performed to determine if a rescaling is required by the current instruction If the step 925 returns "yes", indicating that a rescaling is required, then the current layer is replaced, only for the scope of the current instruction, with a version of the current layer scaled to a width of w_screen and a height of h_screen as defined in the current instruction at step 930. In either case, execution of the process 345 then moves to a step 935, where the current layer is composited over the render image with the top left corner of the current image at the location (x_screen, y_screen) specified by the current instruction. The steps 920, 930, and 935 can be combined in a more optimised fashion in the scope of the present embodiment. In practice, it is likely that an optimised operation that combines one or more of these tasks will be used. The breakdown into individual unambiguous processing steps used in this description is purely for reasons of clarity.

Figure 18B:
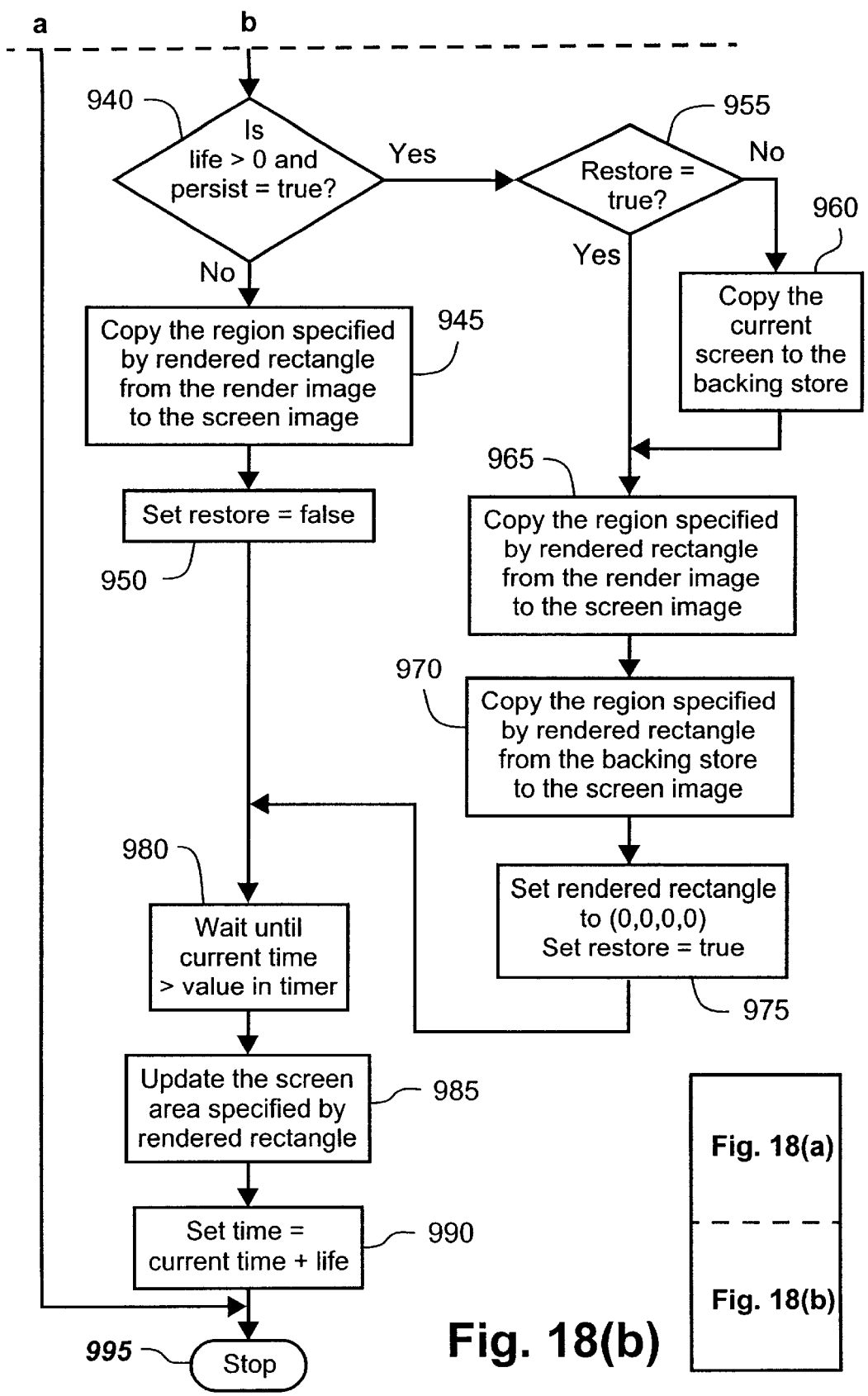

At a following step 940 (see FIG. 18(b)), a test is performed to determine if the layer is persistent and has a life of greater than zero timer ticks. If the step 940 returns a "yes" value, this implies that the render image contains enough information to define the next frame in combination with the current display, and execution moves to a test step 955 where a value of the variable "restore" is tested. If a value of "true" is returned, then the process 345 is directed in accordance with a "yes" arrow to a step 965, in which the region specified by the rendered rectangle is copied from the render image to the screen image. If the test step 955 returns a "false" value, then the process 345 is directed in accordance with a "no" arrow to a step 960, in which the current screen is copied to the backing store, and the process 345 is thereafter directed to the step 965.

Following the step 965, the process 345 is directed to a step 970, in which the region specified by the rendered rectangle is copied from the backing store to the render image, after which, in a step 975, the rendered rectangle is set to (0,0,0,0), and the variable "restore" is set to "true". The process 345 is then directed to a step 980, which directs the process 345 to wait until the "current time" is greater than a value in the timer.

Returning to the step 940, if a value of "false" is returned from the step, then the process 345 is directed in accordance with a "no" arrow to a step 945, in which the region specified by the rendered rectangle is copied from the render image to the screen image. Thereafter, the value of "restore" is set to "false" in a step 950, and the process 345 is directed to the step 980.

After the step 980, the process 345 is directed to a step 985 in which the screen area specified by the rendered rectangle is updated. Thereafter, in a step 990, the timer is set to a value equal to "current time" plus "life", after which the process 345 terminates at the step 995.

Figure 19:
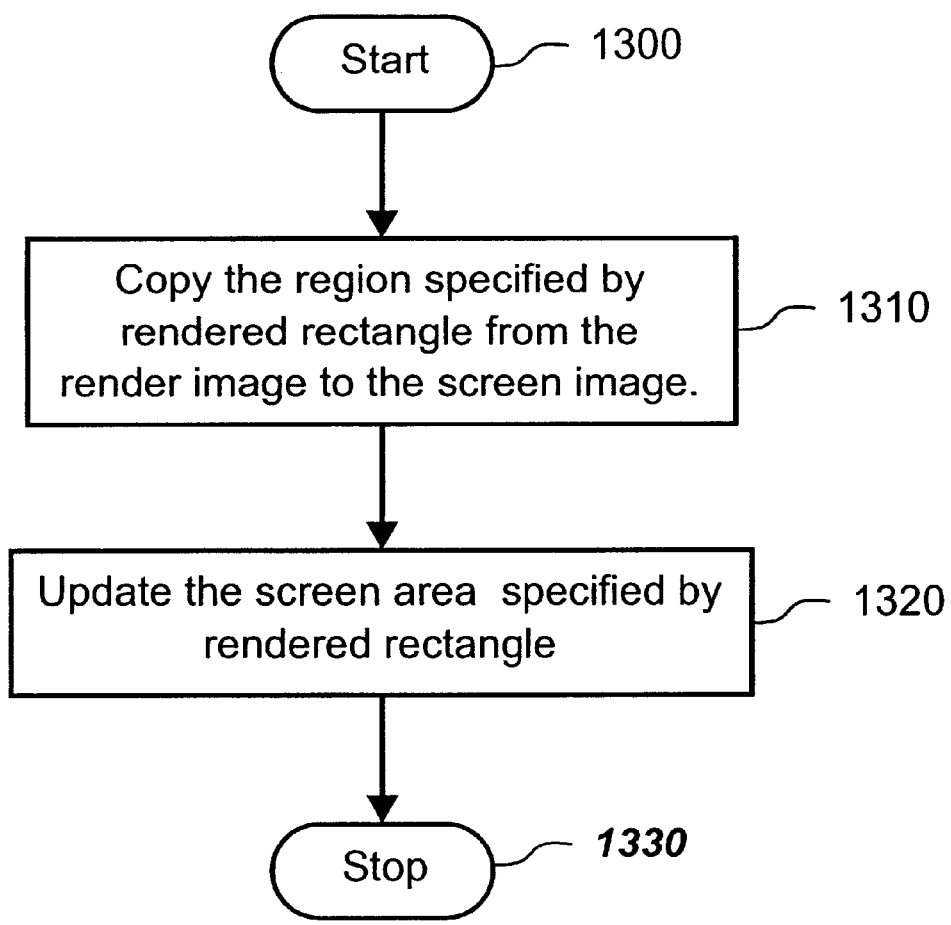
FIG. 19 is a flow diagram of method steps relating to the step of flushing of a rendered rectangle to the screen in FIG. 12.

Step 367 of FIG. 12 is described in detail with reference to FIG. 19. After a commencement step 1300, the process 367 is directed to a step 1310, in which the region specified by the rendered rectangle is copied from the render image to the screen image. Thereafter, in a step 1320, the screen area specified by the rendered rectangle is updated, after which the process 367 terminates in a step 1330.

The method of providing an animation may alternatively be implemented in dedicated hardware such as one or more integrated circuits performing the functions or sub functions of providing an animation. Such dedicated hardware may include graphic processors, digital signal processors, or one or more microprocessors and associated memories.

Figure 20:
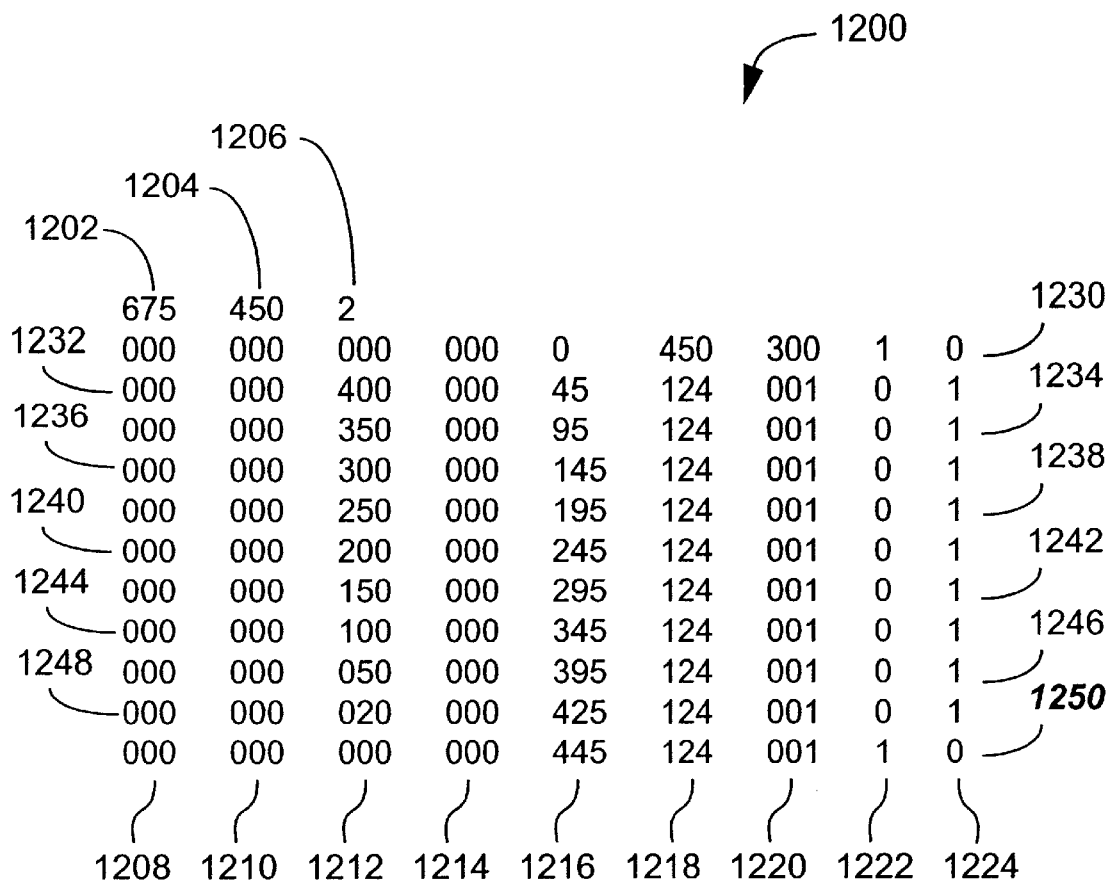
FIG. 20 shows an example of an image file structure in accordance with an embodiment, associated with an animation sequence.
Figure 20:
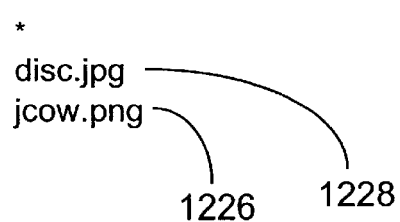

FIG. 20 provides an example of an instruction set associated with an animation sequence by which a first image is "slid" onto a second, background image. The figure shows an instruction set 1200 comprising nine columns 1208–1224 of integers, and two file designations 1226 and 1228. The uppermost integers 1202–1206 of the first three columns 1208–1212 provide header information relating respectively to a width and height of the background image, and the number of layers (ie images) used in the animation. The nine columns 1208–1224 (with the exception of the first row of 3) refer respectively to the variables x_screen, y_screen, x_crop, y_crop, w_crop, h_crop, "persistence", and "next". Apart from the header information, the columns comprise 11 rows, indicating that the animation is performed in eleven steps. Each row represents an instruction, and the 11 rows represent a single instruction set.

Figure 21:
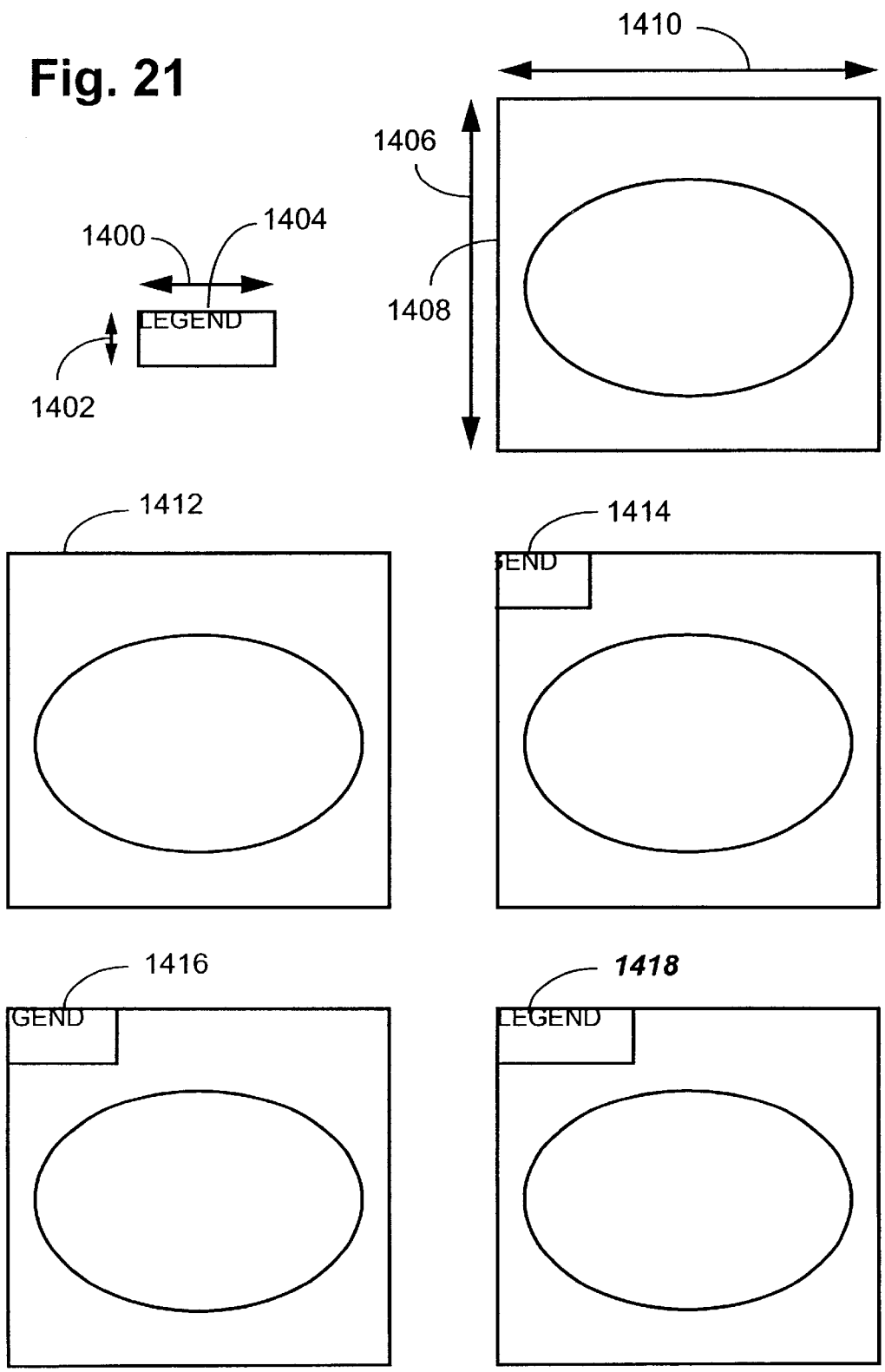
FIG. 21 depicts the animation sequence of FIG. 20.

FIG. 21 depicts the animation sequence of FIG. 20. The figure shows the background image 1408, of a disk on a blank background (ie file 1228 in FIG. 20). The dimensions of the image 1408 are 675 (ie 1202 in FIG. 20) wide (depicted by an arrow 1410), and 450 (ie 1204 in FIG. 20) high (depicted by an arrow 1406). The figure also shows an image 1404 (ie 1226 in FIG. 20) which is to be slid onto the background image 1408. The image 1404 has a width and height depicted by arrows 1400 and 1402 respectively. Four further views of the background image are provided, with the image 1404 slid successively further onto the background image.

A first row 1230 of the instruction set 1200 (see FIG. 20) lays down the background image 1412. The first two integers from the left of the row 1230 which are the x_screen and y_screen values, indicate that the image is to be positioned with it's top left corner at the top left corner of the display area. Since the "next" value of this row 1230, ie the right-most integer, has a value of "0", this indicates that this present image, or layer, will not be re-used, and that the subsequent image, in this case the image 1404, is the next one to process.

The next row 1232, consequently processes the image 1404. The first two integers from the left of the row 1232 which are the x_screen and y_screen values, indicate that the image 1404 is to be positioned with it's top left corner at the top left corner of the display area. The third and fifth integers from the left of the row, ie x_crop and w_crop indicate that part of the image 1404 which is to be "preserved" in the x direction for the present instruction. This is performed by moving x_crop (ie 400) along the image 1404 from the left, and preserving the next w_crop (ie 45) of the image. Similarly, the fourth and sixth integers from the left of the row, ie y_crop and h_crop indicate that part of the image 1404 which is to be "preserved" in the y direction for the present instruction. This is performed by moving y_crop (ie 000) down the image 1404 from the top, and preserving the next h_crop, ie 124, which is, in the present case, the entire image. Accordingly, the rightmost "45", running the full height "124" of the image, is to be preserved, and this is positioned at x_screen, y_screen ie at a (0,0) displacement from the top left hand origin. The result of this is depicted by 1414 in the FIG. 20, which shows the image 1404 partially slid onto the background image. Still considering the row 1232 the seventh integer from the left, ie "life", has a value of 1, indicating that a single tick should occur between completion of execution of the present instruction, and completion of execution of the next instruction. This value of "life" results in a uniform sliding movement of the image 1404.

Still considering the row 1232 the eighth integer from the left, ie "persist", has a value of 0, meaning that the screen value is reset to the pre-execution background prior to the execution of the next instruction.

The right-most column of the instruction row 1232 gives the value of "next" to be 1, meaning that the current layer (image 1404) is to be used with the next instruction, where a slightly longer area is cropped and rendered over the top left corner of the background.

Progressive stages of the image 1404 being slid onto the image 1408, are shown in 1416 and 1418.

INDUSTRIAL APPLICABILITY

It is apparent from the above that embodiments of the invention are applicable to the computer and data processing industries, and in particular to segments of these industries. Furthermore, embodiments of the invention are also applicable to the advertising and entertainment industries.

The foregoing describes only some embodiments of the present invention, and modifications and/or changes can be made thereto without departing from the scope and spirit of the invention, the embodiments being illustrative and not restrictive.

What is claimed is:

1. A method for animating a sequence of image layers according to a sequence of instructions each including a parameter, the method of comprising the steps of:
   (a) applying a current instruction of the sequence of instructions to a current image layer of the sequence of image layers;
   (b) if a parameter of the current instruction has a first value, applying a next instruction of the sequence of instructions to a next image layer of the sequence of image layers; and
   (c) if the parameter of the current instruction has a second value, (d) determining an integer N based on the second value, and (e) applying an $N^{th}$ instruction following the current instruction to the current image layer,
   wherein successive application of instructions of the sequence of instructions to corresponding image layers of the sequence of image layers forms a composite of at least some of the corresponding image layers, and the composite is displayed as animation.

2. A method according to claim 1, wherein between step (b) and step (c) the method further comprises the step of:
   (f) if the parameter of the current instruction has the second value, successively applying N-1 instructions following the current instruction to the sequence of image layers according to at least one of (g) the parameter of the current instruction and (h) parameters of previous instructions.

3. A method according to claim 2, wherein steps (a)–(c) and (f) are repeated a number of times.

4. A method according to claim 3, wherein the method is repeated a number of times.

5. A method for animating a sequence of image layers according to a sequence of instructions each including a parameter, the method of comprising the steps of:
   (a) applying a current instruction of the sequence of instructions to a current image layer of the sequence of image layers;
   (b) if a parameter of the current instruction has a first value, applying a next instruction of the sequence of instructions to a next image layer of the sequence of image layers; and
   (c) if the parameter of the current instruction has a second value, (d) determining a reference based on the second value, and (e) applying an instruction identified by the reference to the current image layer,
   wherein successive application of instructions of the sequence of instructions to corresponding image layers of the sequence of image layers forms a composite of at least some of the corresponding image layers, and the composite is displayed as animation.

6. An apparatus for animating a sequence of image layers according to a sequence of instructions each including a parameter, the apparatus comprising:
   (a) means for applying a current instruction of the sequence of instructions to a current image layer of the sequence of image layers;
   (b) means for, if a parameter of the current instruction has a first value, applying a next instruction of the sequence of instructions to a next image layer of the sequence of image layers; and
   (c) means for, if the parameter of the current instruction has a second value, (d) determining an integer N based on the second value, and (e) applying an $N^{th}$ instruction following the current instruction to the current image layer,
   wherein successive application of instructions of the sequence of instructions to corresponding image layers of the sequence of image layers forms a composite of at least some of the corresponding image layers, and the composite is displayed as animation.

7. An apparatus for animating a sequence of image layers according to a sequence of instructions each including a parameter, the apparatus comprising:
   (a) means for applying a current instruction of the sequence of instructions to a current image layer of the sequence of image layers;
   (b) means for, if a parameter of the current instruction has a first value, applying a next instruction of the sequence of instructions to a next image layer of the sequence of image layers; and (c) means for, if the parameter of the current instruction has a second value, (d) determining a reference based on the second value, and (e) applying an instruction identified by the reference to the current image layer, wherein successive application of instructions of the sequence of instructions to corresponding image layers of the sequence of image layers forms a composite of at least some of the corresponding image layers, and the composite is displayed as animation.

8. An image file encoded for animation, the image file comprising:
   a sequence of image layers; and
   a sequence of instructions each including a parameter, wherein the image file is adapted so that:
   (a) a current instruction of the sequence of instructions may be applied to a current image layer of the sequence of image layers;
   (b) if a parameter of the current instruction has a first value, a next instruction of the sequence of instructions may be applied to a next image layer of the sequence of image layers; and
   (c) if the parameter of the current instruction has a second value, (d) an integer N may be determined based on the second value, and (e) an $N^{th}$ instruction following the current instruction may be applied to the current image layer, and wherein successive application of instructions of the sequence of instructions to corresponding image layers of the sequence of image layers forms a composite of at least some of the corresponding image layers, and the composite is displayed as animation.

9. An image file encoded for animation, the image file comprising:
   a sequence of image layers; and
   a sequence of instructions each including a parameter, wherein the image file is adapted so that:
   (a) a current instruction of the sequence of instructions may be applied to a current image layer of the sequence of image layers;
   (b) if a parameter of the current instruction has a first value, a next instruction of the sequence of instructions may be applied to a next image layer of the sequence of image layers; and
   (c) if the parameter of the current instruction has a second value, (d) a reference may be determined based on the second value, and (e) an instruction identified by the reference may be applied to the current image layer, wherein successive application of instructions of the sequence of instructions to corresponding image layers of the sequence of image layers forms a composite of at least some of the corresponding image layers, and the composite is displayed as animation.

10. A computer-readable memory medium storing a program for controlling an apparatus that animates a sequence of image layers according to a sequence of instructions each including a parameter, the program comprising:
    (a) code for applying a current instruction of the sequence of instructions to a current image layer of the sequence of image layers;
    (b) code for, if a parameter of the current instruction has a first value, applying a next instruction of the sequence of instructions to a next image layer of the sequence of image layers; and
    (c) code for, if the parameter of the current instruction has a second value, (d) determining an integer N based on the second value, and (e) applying an $N^{th}$ instruction following the current instruction to the current image layer, wherein successive application of instructions of the sequence of instructions to corresponding image layers of the sequence of image layers forms a composite of at least some of the corresponding image layers, and the composite is displayed as animation.

11. A computer-readable memory medium storing a program for controlling an apparatus that animates a sequence of image layers according to a sequence of instructions each including a parameter, the program comprising:
    (a) code for applying a current instruction of the sequence of instructions to a current image layer of the sequence of image layers;
    (b) code for, if a parameter of the current instruction has a first value, applying a next instruction of the sequence of instructions to a next image layer of the sequence of image layers; and
    (c) code for, if the parameter of the current instruction has a second value, (d) determining a reference based on the second value, and (e) applying an instruction identified by the reference to the current image layer, wherein successive application of instructions of the sequence of instructions to corresponding image layers of the sequence of image layers forms a composite of at least some of the corresponding image layers, and the composite is displayed as animation.

12. A computer program-product embodying a program for controlling an apparatus that animates a sequence of image layers according to a sequence of instructions each including a parameter, the program comprising:
    (a) code for applying a current instruction of the sequence of instructions to a current image layer of the sequence of image layers;
    (b) code for, if a parameter of the current instruction has a first value, applying a next instruction of the sequence of instructions to a next image layer of the sequence of image layers; and
    (c) code for, if the parameter of the current instruction has a second value, (d) determining an integer N based on the second value, and (e) applying an $N^{th}$ instruction following the current instruction to the current image layer, wherein successive application of instructions of the sequence of instructions to corresponding image layers of the sequence of image layers forms a composite of at least some of the corresponding image layers, and the composite is displayed as animation.

13. A computer program-product embodying a program for controlling an apparatus that animates a sequence of image layers according to a sequence of instructions each including a parameter, a sequence of image layers, the program comprising:
    (a) code for applying a current instruction of the sequence of instructions to a current image layer of the sequence of image layers;
    (b) code for, if a parameter of the current instruction has a first value, applying a next instruction of the sequence of instructions to a next image layer of the sequence of image layers; and
    (c) code for, if the parameter of the current instruction has a second value, (d) determining a reference based on the second value, and (e) applying an instruction identified by the reference to the current image layer, wherein successive application of instructions of the sequence of instructions to corresponding image layers of the sequence of image layers forms a composite of at least some of the corresponding image layers, and the composite is displayed as animation.

* * * * *

UNITED STATES PATENT AND TRADEMARK OFFICE
CERTIFICATE OF CORRECTION

| | |
|---|---|
| PATENT NO. | : 6,714,202 B2 |
| APPLICATION NO. | : 09/726026 |
| DATED | : March 30, 2004 |
| INVENTOR(S) | : Andrew James Dorrell |

It is certified that error appears in the above-identified patent and that said Letters Patent is hereby corrected as shown below:

COLUMN 1

Line 17, "layer" should read --layer.--.
    Line 45, "(Rb, Gb, Bb Ab);" should read --(Rb, Gb, Bb, Ab);--.

COLUMN 2

Line 3, "screen," should read --screen;--.
    Line 19, "GE" should read --GIF--.
    Line 37, "fill" should read --full--.

COLUMN 3

Line 29, "to" (first occurrence) should be deleted.

COLUMN 4

Line 64, "image." should read --image;--.

COLUMN 5

Line 36, "invention," should read --invention;--

COLUMN 7

Line 24, "corrected" should read --connected--.
    Line 27, "medium" should read --mediums--.

COLUMN 8

Line 40, "3 th" should read --3--.
    Line 41, "3/100" should read --3/100ths--.
    Line 64, "file the" should read --file - the--.

COLUMN 9

Line 41, "true" should read --"true"--.
    Line 63, "true" should read --"true"--.

UNITED STATES PATENT AND TRADEMARK OFFICE
CERTIFICATE OF CORRECTION

PATENT NO. : 6,714,202 B2
APPLICATION NO. : 09/726026
DATED : March 30, 2004
INVENTOR(S) : Andrew James Dorrell It is certified that error appears in the above-identified patent and that said Letters Patent is hereby corrected as shown below:

COLUMN 10

Line 27, "layee's" should read --layer's--.
Line 35, "true" should read --"true"--.
Line 40, "return" should read --returns--.

COLUMN 17

Line 56, "zeros" should read --zeros.--.

COLUMN 19

Line 23, "no" should read --"no",--.
Line 44, "instruction" should read --instruction.--

COLUMN 20

Line 47, "h_crop," should read --h_crop, "life",--.

COLUMN 21

Line 58, "of" (first occurrence) should be deleted.

COLUMN 22

Line 21, "of" (first occurrence) should be deleted.

UNITED STATES PATENT AND TRADEMARK OFFICE
CERTIFICATE OF CORRECTION

PATENT NO. : 6,714,202 B2
APPLICATION NO. : 09/726026
DATED : March 30, 2004
INVENTOR(S) : Andrew James Dorrell It is certified that error appears in the above-identified patent and that said Letters Patent is hereby corrected as shown below:

<u>COLUMN 24</u>

Line 48, "paramenter," should read --parameter,--; and "a sequence of image layers" should be deleted.

Signed and Sealed this

Nineteenth Day of June, 2007

JON W. DUDAS
*Director of the United States Patent and Trademark Office*